(12) United States Patent
Nakatsugawa

(10) Patent No.: US 8,458,473 B2
(45) Date of Patent: Jun. 4, 2013

(54) INFORMATION PROCESSING APPARATUS, METHOD FOR SWITCHING CIPHER AND PROGRAM

(75) Inventor: Yasumasa Nakatsugawa, Tokyo (JP)

(73) Assignee: Sony Corporation, Tokyo (JP)

( * ) Notice: Subject to any disclaimer, the term of this patent is extended or adjusted under 35 U.S.C. 154(b) by 851 days.

(21) Appl. No.: 12/579,025

(22) Filed: Oct. 14, 2009

(65) Prior Publication Data

US 2010/0180118 A1  Jul. 15, 2010

(30) Foreign Application Priority Data

Oct. 14, 2008  (JP) .................................. 2008-265322

(51) Int. Cl.
*G06F 21/00* (2006.01)
(52) U.S. Cl.
USPC .......................................................... 713/169
(58) Field of Classification Search
None
See application file for complete search history.

(56) References Cited

U.S. PATENT DOCUMENTS

| | | | |
|---|---|---|---|
| 6,073,236 A | 6/2000 | Kusakabe et al. | |
| 6,792,541 B1 | 9/2004 | Kusakabe et al. | |
| 7,003,671 B1 | 2/2006 | Kusakabe et al. | |
| RE39,622 E | 5/2007 | Kusakabe et al. | |
| 7,437,526 B2 | 10/2008 | Kusakabe et al. | |
| 2004/0030896 A1* | 2/2004 | Sakamura et al. ............ | 713/169 |

FOREIGN PATENT DOCUMENTS

| | | |
|---|---|---|
| FR | 2 820 847 A1 | 8/2002 |
| JP | 10-20780 | 1/1998 |
| JP | 10-327142 | 12/1998 |
| JP | 2000-36014 | 2/2000 |
| JP | 2000-36021 | 2/2000 |
| JP | 3890602 | 12/2006 |

OTHER PUBLICATIONS

European Search Report dated Mar. 30, 2010, from the European Patent Office in EP 09252216.8.

* cited by examiner

*Primary Examiner* — Hadi Armouche
*Assistant Examiner* — Malcolm Cribbs
(74) *Attorney, Agent, or Firm* — Finnegan, Henderson, Farabow, Garrett & Dunner, L.L.P.

(57) ABSTRACT

An information processing apparatus is provided which includes a plurality of encryption algorithm units which are respectively capable of performing mutual authentication with an external device by respectively using an encryption method or a cipher key being different from one another; and a data memory unit which stores a plurality of cipher-specific information being provided to each of the encryption algorithm units and including a cipher type which specifies an encryption method used by each of the encryption algorithm units and disabling control information for disabling at least one encryption algorithm unit among the plurality of encryption algorithm units; wherein at least a first encryption algorithm unit among the plurality of encryption algorithm units disables another encryption algorithm unit in accordance with the disabling control information which is stored at the data memory unit when a mutual authentication with an external device succeeds.

14 Claims, 23 Drawing Sheets

FIG.19

| ADDRESS CONVERSION TABLE ~82 | |
|---|---|
| NORMAL | FOR DISABLING PROCESS |
| 0000 | 0180 |
| 0001 | 0181 |
| 1008 | 1182 |

INFORMATION PROCESSING APPARATUS, METHOD FOR SWITCHING CIPHER AND PROGRAM

BACKGROUND OF THE INVENTION

1. Field of the Invention

The present invention relates to an information processing apparatus, a method for switching cipher and a program.

2. Description of the Related Art

In the related art, an integrated circuit (IC) card in which an integrated circuit capable of recording information and performing computation is integrated has been in actual use. In particular, an IC card having a processor in the integrated circuit to perform sophisticated information processing, which is called a smart card, is recently used widely for various applications as banking means or personal identification means in daily life.

In accordance with expansion of usage scenes of the IC card, technology to enhance security for using various services with the IC card has been developed. For example, instead of a data encryption standard (DES) method of 64 bit block encryption type which had been widely used in the related art, an advanced encryption standard (AES) method capable of selecting key length from three kinds of 128 bits, 192 bits and 256 bits as encryption algorithm for encrypting data is getting to be adopted by various organizations.

For example, following documents have disclosed technology in which such encryption technique is adopted for IC cards. In Japanese Patent Application Laid-open (JP-A) No. 2000-36014, it is proposed that managing information is encrypted and transmitted to the IC card in order to prevent manipulation and interception etc. of the managing information which is to be stored in the IC card for managing user data. Further, in JP-A No. 2000-36021, it is proposed to improve security of data confidentiality etc. by layering structure of an area definition field and a service definition field for managing a storage field of user data and locking each of the definition fields. Further, in Japanese Patent NO. 3890602, it is proposed to provide access right to a plurality of area definition blocks which define usage of user blocks in order to control access to data in an IC card. Furthermore, in JP-A Nos. H10-020780 and H10-327142, a method to perform mutual authentication between an IC card and a reader/writer using a plurality of authentication keys and random numbers is proposed.

SUMMARY OF THE INVENTION

While security strength of the encryption algorithm is enhanced, cost which is borne by users and service providers when replacing encryption algorithms supported by IC cards which are widely spread in the market is becoming large to be not negligible.

FIG. 1 briefly illustrates a transition procedure when IC cards and reader/writers for reading and writing data of the IC cards are replaced. That is, in FIG. 1(1a), both the IC card and the reader/writer support only an old or former encryption algorithm before the replacement (hereinafter, called former encryption algorithm). Then, first, the reader/writer is replaced to a reader/writer which is capable of supporting both updated encryption algorithm (hereinafter, called new encryption algorithm) and the former encryption algorithm in 1b. Then, after replacement of the reader/writer is completed, the IC card is replaced to an IC card which is capable of supporting the new encryption algorithm in 1c.

FIG. 2 illustrates variation of the number of IC card issuance distributed in the market along the transition procedure of FIG. 1. As illustrated in FIG. 2, the IC cards which support the former encryption algorithm (hereinafter, called former IC cards) are continued to be issued from the timing T1 of starting the replacement of the reader/writer until the timing T2 of completing the replacement. The reason is that the reader/writers which do not support the new encryption algorithm still remain in part and there is a possibility that such old reader/writers are used by users. Subsequently, from the timing T2 of completion of the replacement of the reader/writers, issuing of the IC cards which support the new encryption algorithm (hereinafter, called new IC cards) is started.

In the transition procedure illustrated in FIG. 2, users who purchased the former IC card between T1 and T2 need to go through a process to replace the former IC card with the new IC card after T2. Further, the service provider is urged to perform card replacement tasks corresponding to the number of the issued former IC cards. On the contrary, in a state that the timing of starting of issuing the new IC cards is advanced to be earlier than the timing of completing the reader/writer replacement (T2 in FIG. 2) and the process of replacing the former IC card with the new IC card is automated, burdens for both the users and the service providers can be lightened.

The present invention has been made in view of the above-mentioned issues, and it is desirable to provide a new and improved information processing apparatus, a method for switching cipher and a program with which an additional process for switching encryption algorithm supported by an IC card can be omitted.

According to an embodiment of the present invention, there is provided an information processing apparatus including, a plurality of encryption algorithm units which are respectively capable of performing mutual authentication with an external device by respectively using an encryption method or a cipher key being different from one another, and a data memory unit which stores a plurality of cipher-specific information being provided to each of the encryption algorithm units and including a cipher type which specifies an encryption method used by each of the encryption algorithm units and disabling control information for disabling at least one encryption algorithm unit among the plurality of encryption algorithm units. At least a first encryption algorithm unit among the plurality of encryption algorithm units disables another encryption algorithm unit in accordance with the disabling control information which is stored at the data memory unit when a mutual authentication with an external device succeeds.

With the information processing apparatus of the above-mentioned configuration, for example, mutual authentication by the second encryption algorithm unit which supports the former encryption algorithm can be performed until mutual authentication by the first encryption algorithm unit which supports the new encryption algorithm succeeds firstly. Then, after the first mutual authentication by the first encryption algorithm unit succeeds, for example, the second encryption algorithm unit is disabled in accordance with the disabling control information which is stored at the data memory unit.

The disabling control information may include a valid cipher type for distinguishing a valid encryption method among encryption methods used by the plurality of encryption algorithm units, and each of the encryption algorithm units may perform mutual authentication with an external device only in a case that a cipher type which is specified by an authentication request received from the external device is included in the valid cipher type which is stored at the data memory unit.

The disabling control information may further include a disabling cipher type for distinguishing an encryption method to be automatically disabled, and the first encryption algorithm unit may delete a cipher type which matches with the disabling cipher type from the valid cipher types stored at the data memory unit when the mutual authentication with the external device succeeds.

The cipher-specific information may further include a generation number which specifies a generation of a cipher key used by each of the encryption algorithm units, and the first encryption algorithm unit may disable another encryption algorithm unit corresponding to a generation number which is older than a generation number which is specified by an authentication request received from the external device when the mutual authentication with the external device succeeds.

The disabling control information may include a valid generation number for distinguishing a valid encryption algorithm unit among the plurality of encryption algorithm units, and the first encryption algorithm unit may disable the other encryption algorithm unit by updating the valid generation number.

The first encryption algorithm unit may disable another encryption algorithm unit in accordance with the disabling control information which is stored at the data memory unit only in a case that a special authentication request which instructs execution of disabling is received from the external device.

The data memory unit may store a priority order which is predefined in accordance with security strength of each of the encryption algorithm units, and the first encryption algorithm unit may disable another encryption algorithm unit of which priority order is lower than that of the first encryption algorithm unit when the mutual authentication with an external device succeeds.

According to another embodiment of the present invention, there is provided a method for switching cipher including the steps of: storing a plurality of cipher-specific information being provided to each of a plurality of encryption algorithm units and including a cipher type which specifies an encryption method used by each of the encryption algorithm units and disabling control information for disabling at least one encryption algorithm unit among the plurality of encryption algorithm units at a memory area of an information processing apparatus which includes the plurality of encryption algorithm units capable of respectively performing mutual authentication with an external device by respectively using an encryption method or a cipher key being different from one another, performing a mutual authentication with an external device by a first encryption algorithm unit among the plurality of encryption algorithm units, and disabling another encryption algorithm unit in accordance with the disabling control information which is stored at the memory area by the first encryption algorithm unit when a mutual authentication by the first encryption algorithm unit succeeds.

According to another embodiment of the present invention, there is provided a computer program product causing a computer which controls an information processing apparatus to operate as a plurality of encryption algorithm units which are respectively capable of performing mutual authentication with an external device by respectively using an encryption method or a cipher key being different from one another, and disable another encryption algorithm unit by a first encryption algorithm unit in accordance with disabling control information stored at a data memory unit of the own apparatus for disabling at least one encryption algorithm unit among the plurality of encryption algorithm units when at least the first encryption algorithm unit among the plurality of encryption algorithm units succeeds in mutual authentication with an external device.

As described above, with the information processing apparatus, the method for switching cipher and the program, the additional process for switching encryption algorithm supported by an IC card can be omitted.

BRIEF DESCRIPTION OF THE DRAWINGS

FIG. 19 is an explanatory table which shows an example of an address conversion table;

DETAILED DESCRIPTION OF EMBODIMENT

Figure 1:
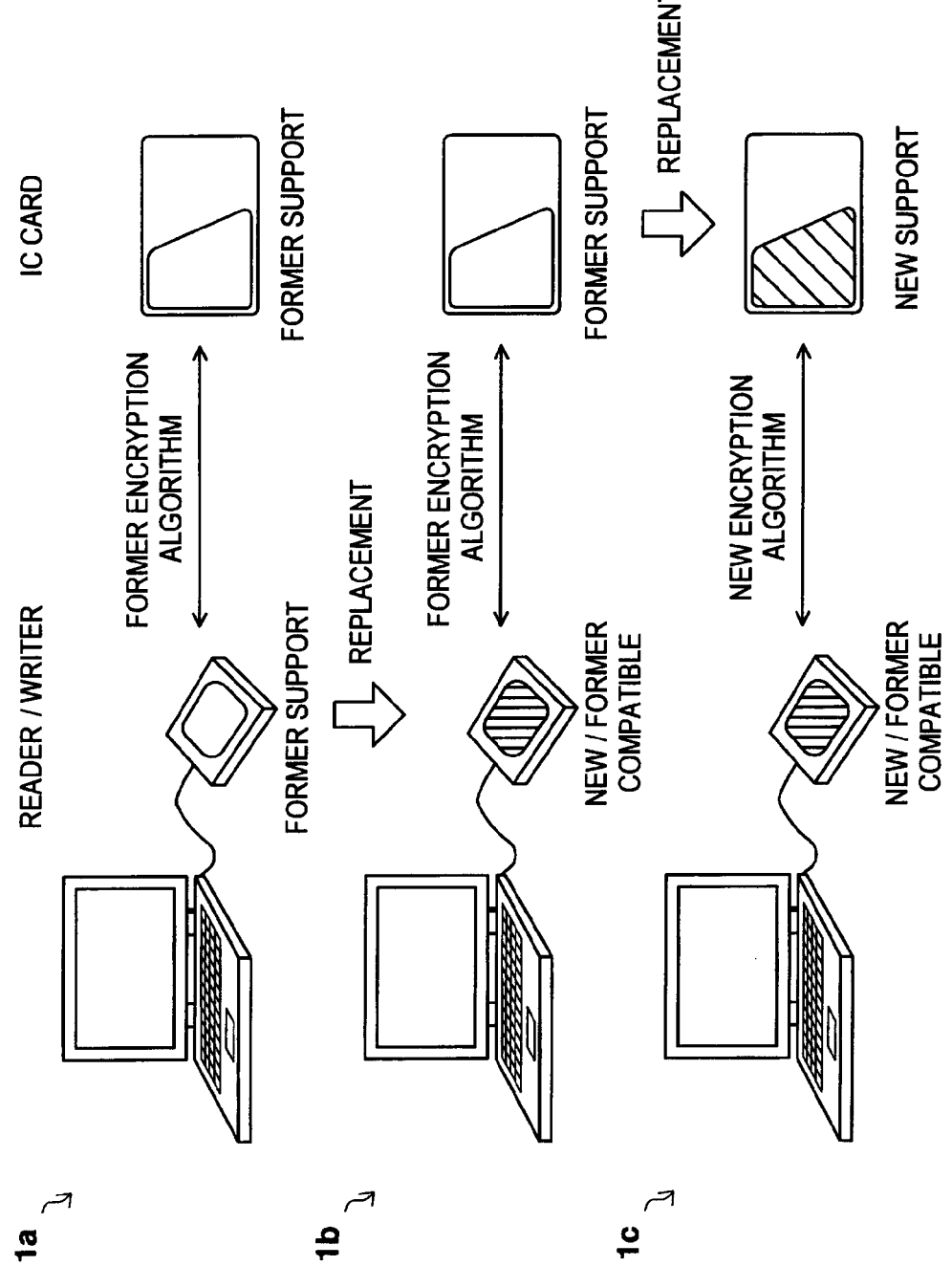
FIG. 1 is a schematic view which illustrates an overview of a transition procedure of encryption algorithm of an IC card.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

Herein, exemplary embodiments of the present invention are described in the following order.
1. Summary of the communication system
2. Description of the first embodiment
3. Description of modified examples
4. Description of the second embodiment

1. Summary of Communication System

First, a summary of a communication system 1 according to an embodiment of the present invention is described with reference to FIG. 3.

Figure 3:
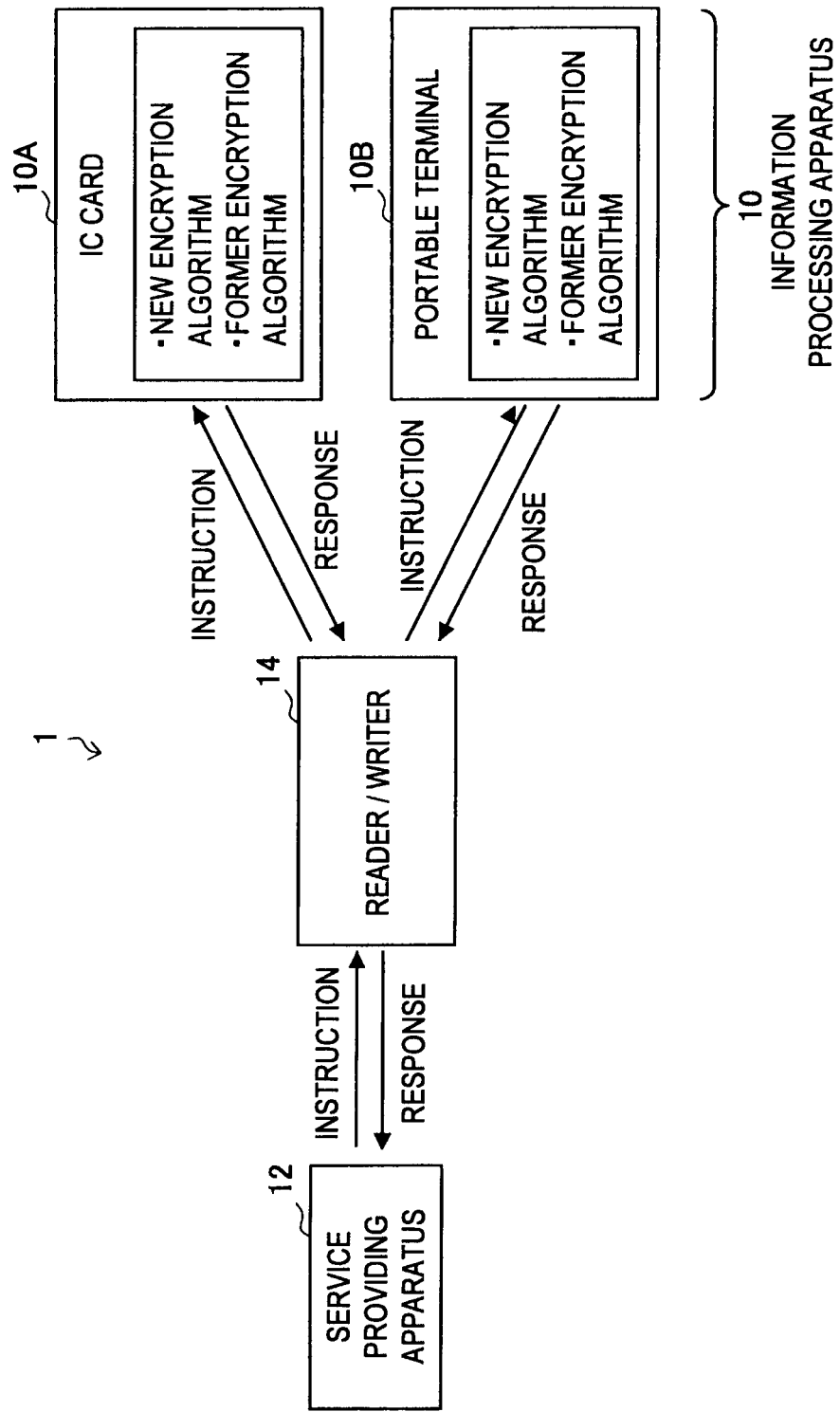
FIG. 3 is a block diagram which illustrates an overview of a communication system according to an embodiment of the present invention.

FIG. 3 is a block diagram which illustrates the summary of the communication system 1 according to the embodiment of the present invention. As illustrated in FIG. 3, the communication system 1 includes an information processing apparatus 10 (for example, an IC card 10A, a portable terminal 10B and the like), a service providing apparatus 12 and a reader/writer 14.

For example, the information processing apparatus 10 may be a non-contact type IC card 10A incorporating an IC chip which is an electronic circuit for performing non-contact communication with the reader/writer 14 (i.e., a data reading and writing device) which is an external device. The IC card 10A is the information processing apparatus including an antenna for performing non-contact communication with the reader/writer 14 and the IC chip on which an IC for performing a predetermined arithmetic process within a thin card package. The IC card 10A is capable of wire communicating with the reader/writer 14 in a non-contact manner. For example, data in the IC card 10A can be read or written by the reader/writer 14 simply by holding the IC card 10A within an effective range of electromagnetic waves radiated from the reader/writer 14. Herein, not limited to such an example, the IC card 10A can be a contact-type IC card.

The IC card 10A is adopted to IC card systems which provide a variety of services. For example, the IC card 10A can be adopted to an electronic money system, a ticket gate system of transportation, a security system for accessing a building or for logging-in to a computer, an electronic banking system, and the like. More specifically, the IC card 10A is utilized for the following usage of 1 to 6, for example. Further, a multi-application type card which has a plurality of functions with a single IC card 10A has been developed, so that the variety of kinds of the IC cards 10A are increasing.

1. An electronic money card which memorizes an electronic value (i.e., data having value of money or quasi-money) such as electronic money, points and coupons
2. A season ticket or a reserve ticket of transportation such as railways, buses and highways and a transportation card which memorizes data such as prepaid fares
3. A personal authentication card used for personal identification such as an employee ID and student ID to be used for personal status confirmation and for a key of managing starting and quitting time of work, accessing a building, logging-in to a personal computer
4. A membership card, a point card and a coupon card for a variety of shops and facilities
5. An electronic ticket card which memorizes an electronic ticket of movie theaters, concert halls, sport stadiums and amusement facilities etc.
6. An electronic banking card which is utilized for electronic commercial transaction such as shopping through the interne, distribution of video and music contents, dealing of financials of stocks and deposits etc.

Further, the information processing apparatus 10 may be a portable terminal 10B as a portable type information processing apparatus on which the abovementioned IC chip is incorporated. The portable terminal 10B is actualized as a cellular phone terminal, a watch, a personal digital assistant (PDA), a portable game terminal, and portable video/audio player etc. Similar to the abovementioned IC card 10A, the portable terminal 10B is also used for enjoying the variety of abovementioned services by performing non-contact communication with the reader/writer 14.

The service providing apparatus 12 is a host apparatus for providing services to users through the information processing apparatus 10 such as the IC card 10A and the portable terminal 10B. Specifically, the service providing apparatus 12 is actualized as an automated ticket gate of transportation, a register device at a shop such as a convenience store, a terminal device used for electronic dealing through the internet (i.e., a personal computer etc.), a vending machine for various products and transportation tickets, a POS terminal, a kiosk terminal, and an automated teller machine (ATM) of a financial institution, for example. The service providing apparatus 12 includes the reader/writer 14 for performing non-contact communication with the information processing apparatus 10. Herein, the reader/writer 14 may be incorporated and integrated with the service providing apparatus 12 or may be configured as a separate device which is connected to be capable of performing wireless or wired communication with the service providing apparatus 12.

The reader/writer 14 performs wireless or wired communication with the information processing apparatus 10 pursuant to a predetermined communication method such as ISO/IEC 18092, for example. More specifically, the reader/writer 14 transmits an instruction which is output from the service providing apparatus 12 to the information processing apparatus 10, for example. Then, the reader/writer 14 receives a response against the instruction from the information processing apparatus 10 and inputs to the service providing apparatus 12.

In the configuration of the communication system 1 which is illustrated in FIG. 3, the IC chip which is mounted on the information processing apparatus 10 is provided with an encryption processing circuit (for example, a processor) supporting a plurality of encryption algorithms which respectively adopt an encryption method or an cipher key being different from one another. The encryption method denotes arbitrary cryptography such as symmetric-key cryptography of DES, AES, Camellia, CLEFIA etc., for example, and public key cryptography of Revest Shamir Adleman (RSA) etc. Accordingly, for example, the plurality of encryption algorithms may be encryption algorithms utilizing respective encryption methods selected from DES, AES of 128 bits (hereinafter, called AES128), AES of 256 bits (hereinafter called AES256) which are different from one another. Further, the plurality of encryption algorithms may be encryption algorithms with the same encryption method (for example, AES128 etc.) of which cipher key generations are different. Each of the encryption algorithms respectively has merits and demerits on security reliability, encryption processing loads and the like.

For example, the plurality of encryption algorithms correspond to the former encryption algorithm and the new encryption algorithm which are described with reference to FIGS. 1 and 2. Since the information processing apparatus 10 supports the new and former algorithms, the information processing apparatus 10 performs communication with the reader/writer 14 using former encryption algorithm when the reader/writer 14 supports still only the former encryption algorithm, for example. Then, the information processing apparatus 10 can perform communication using the new encryption algorithm without changing an IC chip when the reader/writer 14 supports the new encryption algorithm.

Herein, even though the communication with the reader/writer 14 using the new encryption algorithm becomes possible, the security strength of the information processing apparatus 10 remains at that of the former encryption algorithm as long as the former encryption algorithm is valid with the information processing apparatus 10. The reason is that there remains risk of unauthorized access and data manipulation by decrypting the cipher key of the former encryption algorithm, for example. Therefore, in the information processing apparatus 10, it is desirable to actualize a system to disable the former algorithm preferably without an additional process for users and service providers when the former encryption algorithm becomes redundant.

Then, two embodiments and modified examples of the embodiments of the information processing apparatus having a function to automatically disable the encryption algorithm which becomes redundant for usage are described in details in the following.

Figure 4:
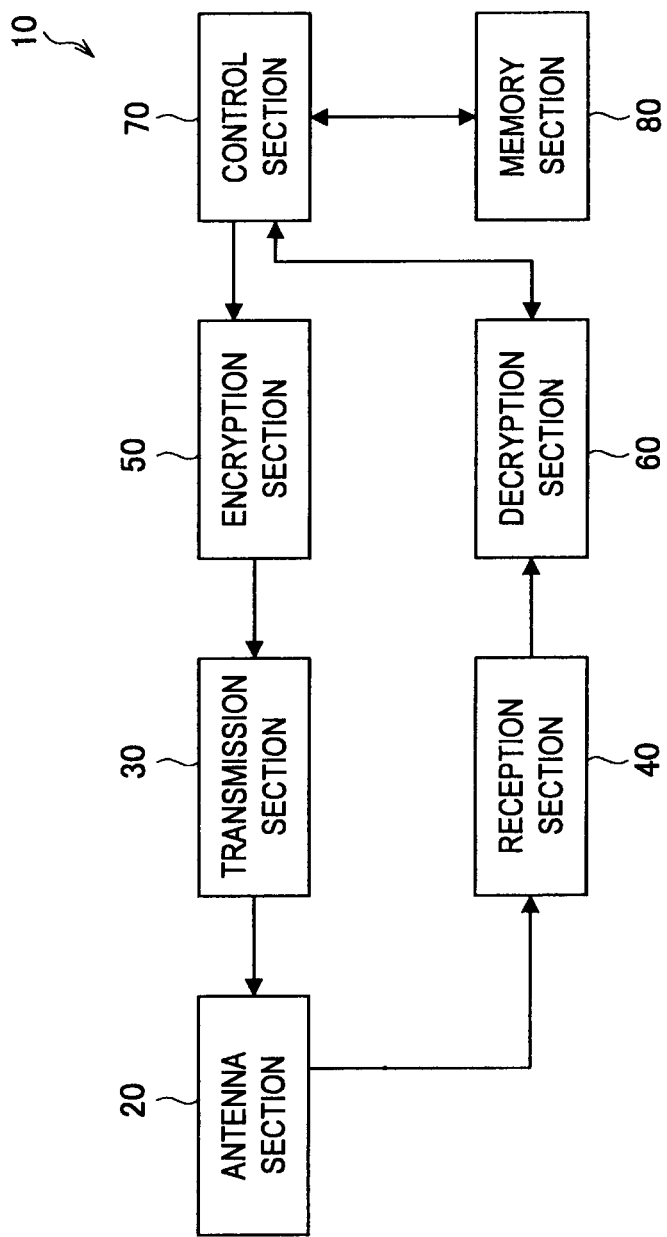
FIG. 4 is a block diagram which illustrates a physical configuration of an information processing apparatus according to the first embodiment.

2. Description of First Embodiment 2-1. Configuration Example of Information Processing Apparatus FIG. 4 is a block diagram which illustrates a physical configuration of the information processing apparatus 10 according to the first embodiment. As illustrated in FIG. 4, the information processing apparatus 10 includes an antenna section 20, a transmission section 30, a reception section 40, an encryption section 50, a decryption section 60, a control section 70 and a memory section 80.

The antenna section 20 is an antenna for performing communication in a non-contact manner with the reader/writer 14. In the present embodiment, the information processing apparatus 10 is a non-contact IC card as an example. The reception section 40 demodulates reception data received from the reader/writer 14. The decryption section 60 decrypts the reception data which is demodulated by the reception section 40. The encryption section 50 encrypts transmission data to the reader/writer 14. The transmission section 30 modulates the transmission data which is encrypted by the encryption section 50. The control section 70 controls each of the sections in the information processing apparatus 10. The memory section 80 is a memory which maintains data such as user data and managing data.

For example, the transmission section 30, the reception section 40, the encryption section 50, the decryption section 60, the control section 70 and the memory section 80 are configured with predetermined circuits and incorporated into a small chip.

The antenna section 20 is configured with a coil antenna which is arranged along the periphery of the IC card 10A, for example, in the case that the information processing apparatus 10 is the IC card 10A and connected to the transmission section 30 and the reception section 40.

The transmission section 30 and the reception section 40 (i.e., communication sections) are configured with a modulation and demodulation circuit which is not illustrated, a front-end circuit and a power reflex circuit, for example. The modulation and demodulation circuit modulates and demodulates data with a ASK modulation method, for example. The power reflex circuit generates induced electromotive force from an RF operational magnetic field of carrier waves which are received from the reader/writer 14 with the antenna section 20 and takes in as the power for the information processing apparatus 10. The front-end circuit receives the carrier waves which are transmitted from the reader/writer 14 with the antenna section 20 and demodulates the carrier waves. Then, the front-end circuit obtains an instruction or data from the reader/writer 14 and supplies to the control section 70. Further, the front-end circuit regenerates a clock for operating the information processing apparatus 10 by dividing the carrier waves. In addition, the front-end circuit modulates the carrier waves in accordance with the instruction or data of a predetermined service generated by the control section 70 and transmits the modulated carrier waves to the reader/writer 14 through the antenna section 20.

The encryption section 50 and the decryption section 60 structures an encryption processing unit and are configured with dedicated hardware such as an encryption co-processor which has an encryption processing function, for example. The encryption section 50 and the decryption section 60 according to the present embodiment are processors which are respectively capable of supporting the plurality of encryption algorithms being different from one another. By incorporating these processors, the information processing apparatus 10 becomes capable of performing mutual authentication with the reader/writer 14 that is an external device by using the plurality of encryption algorithms. Herein, in order to perform communication using the encryption algorithm which is capable of being supported by the encryption section 50 and decryption section 60, cipher-specific information etc. which corresponds to the encryption algorithm is to be maintained at a predetermined area of the memory section 80.

The control section 70 is configured with a processing unit such as a microprocessor, a ROM and a RAM. The control section 70 performs a predetermined arithmetic process while controlling each section within the information processing apparatus 10. The control section 70 operates pursuant to a program which is stored at a memory medium such as the memory section 80 and the ROM which is not illustrated and performs the predetermined arithmetic process, command generation, and control of transmitting/receiving and reading/writing of various information. For example, when communicating with the reader/writer 14 regarding a predetermined service, the control section 70 reads/writes user data of the service from/to the memory section 80. Further, the control section 70 controls the encryption process or the decryption process of the data which is performed by the encryption section 50 or the decryption section 60. At that time, the control section 70 also controls necessity of the encryption and decryption processes, so that the transmission/reception data is not always encrypted or decrypted.

Figure 5:
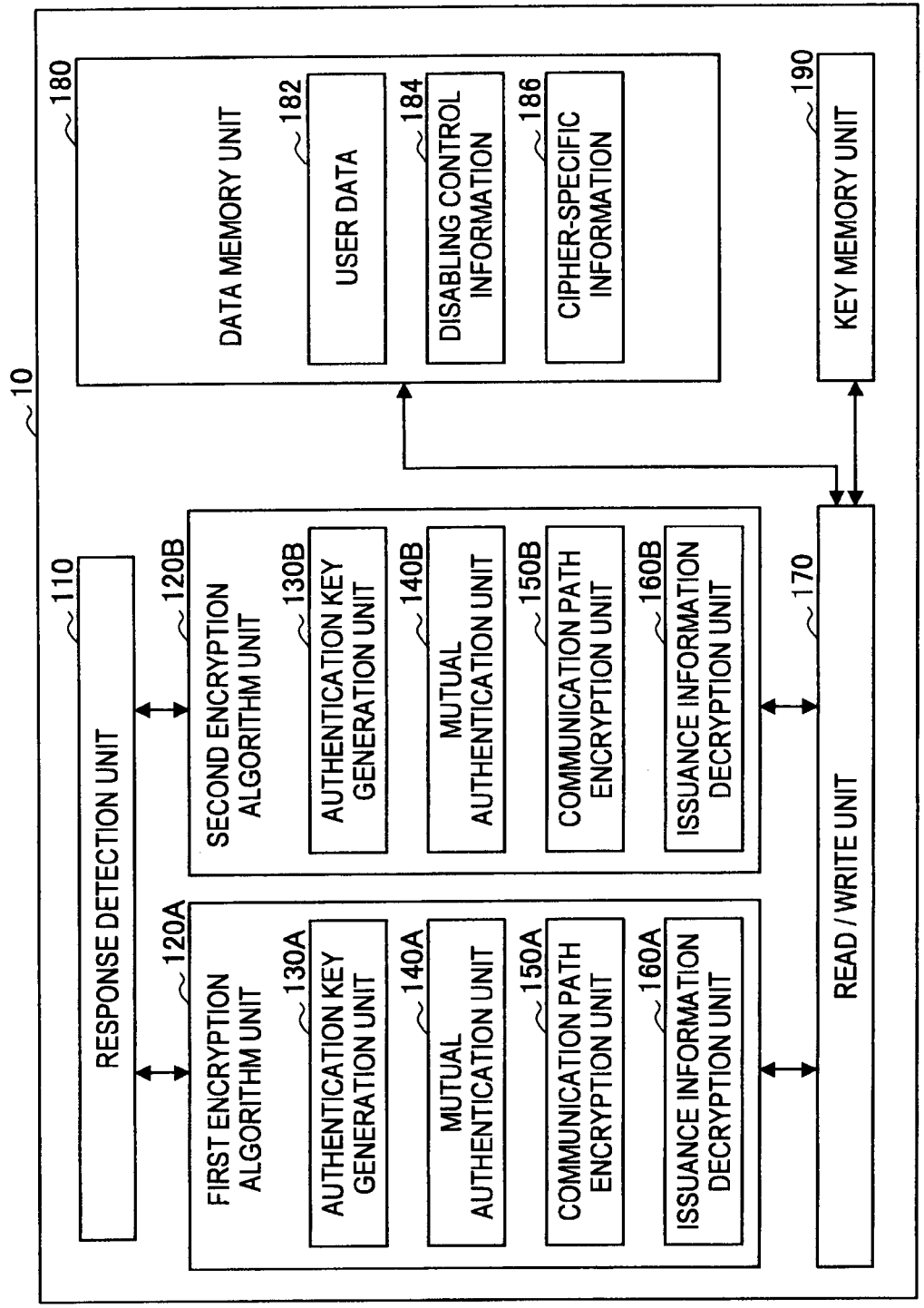
FIG. 5 is a block diagram which illustrates a physical configuration of an information processing apparatus according to the first embodiment.

The memory section 80 is configured with a semiconductor memory such as a flash memory, an electrically erasable programmable ROM (EEPROM) and a ferroelectric RAM (FeRAM), for example. As illustrated in FIG. 5, the memory section 80 functions as a data memory unit 180 and a key memory unit 190. The memory section 80 stores user data and control data of the service which is provided to a user by the service providing apparatus 12 and a cipher key which is used for each of the encryption algorithms. Herein, besides the semiconductor memory, the memory section 80 may be configured with another memory device such as a hard disk drive (HDD).

FIG. 5 is a block diagram which illustrates the logical configuration of the information processing apparatus 10 according to the present embodiment. As illustrated in FIG. 5, the information processing apparatus 10 includes a response detection unit 110, a first encryption algorithm unit 120A, a second encryption algorithm unit 120B, a read/write unit 170, a data memory unit 180 and a key memory unit 190. Further, each of the encryption algorithm units 120 respectively includes an authentication key generation unit 130, a mutual authentication unit 140, a communication path encryption unit 150 and an issuance information decryption unit 160. Hereinafter, the first encryption algorithm unit 120A and the second encryption algorithm unit 120B are collectively called the encryption algorithm unit 120 when the distinguishing therebetween is inessential. Each of the other units 130-170 is also collectively called in the same manner.

The response detection unit 110 has a function corresponding to a polling command which is proposed in ISO/IEC 18092, for example. When the polling command regarding a predetermined IC card system or service is received from the reader/writer 14, the response detection unit 110 generates a response command of the corresponding IC card and replies to the reader/writer 14 as the response thereof. The response detection unit 110 is provided commonly to the plurality of encryption algorithms.

The first encryption algorithm unit 120A and the second encryption algorithm unit 120B are capable of performing mutual authentication respectively with external devices (for example, the reader/writer 14) by utilizing the respectively different encryption algorithm or cipher key. In the following, the authentication key generation unit 130, the mutual authentication unit 140, the communication path encryption unit 150 and the issuance information decryption unit 160 which are provided commonly to each of the encryption algorithm units 120 are described.

The authentication key generation unit 130 generates an authentication key for mutual authentication between the information processing apparatus 10 and the reader/writer 14. For example, a method which is disclosed in JP-A No. 10-327142 may be used as the method of generating the authentication key. The summary thereof is as follows. The authentication key generation unit 130 generates the authentication key with a service key of the memory area which is used for the service usage and an ID which is uniquely allocated to each of the information processing apparatuses 10 (hereinafter, called a card ID). When a plurality of services are simultaneously used, a regression key is generated from the plurality of service keys and the authentication key is generated with the regression key and the card ID. The mutual authentication unit 140 performs mutual authentication by using this authentication key.

The mutual authentication unit 140 performs mutual authentication between the information processing apparatus 10 and the reader/writer 14. For example, a method which is disclosed in JP-A No. 10-020780 or proposed in ISO/IEC9798 may be used as the mutual authentication method. The summary thereof is as follows. The mutual authentication unit 140 decrypts a first random number received from the reader/writer 14 with the authentication key which is generated by the authentication key generation unit 130 and replies after re-encrypting. Further, also in the information processing apparatus 10, the mutual authentication unit 140 generates a second random number and transmits to the reader/writer 14 after encryption with the same authentication key. Then, the mutual authentication unit 140 receives a reply thereof from the reader/writer 14 and examines whether or not the reply matches with the sent second random number. In this manner, both of the reader/writer 14 and the information processing apparatus 10 performs mutual authentication by respectively examining whether or not the random numbers which are generated respectively are correct. The mutual authentication process is performed with an encryption algorithm which is specified by the reader/writer 14.

Further, when at least one of the mutual authentication units 140 of the plurality of encryption algorithm units 120 (for example, the mutual authentication unit 140A of the first encryption algorithm unit 120A) succeeds in a mutual authentication with an external device, the mutual authentication unit 140 disables another encryption algorithm unit 120 (for example, the second algorithm unit 120B) in accordance with disabling control information 184 which is stored at the data memory unit 180. The disabling process is described later further in details.

The communication path encryption unit 150 encrypts a communication path between the information processing apparatus 10 and the reader/writer 14 by utilizing, for example, a block encryption method which is shown in NIST SP 800-38. Specifically, after the above-mentioned mutual authentication, the communication path encryption unit 150 transmits and receives the communication data which is to be transmitted and received while the communication path is encrypted by using, as a session key, a communication path key generated with the random number which is mutually confirmed.

The issuance information decryption unit 160 obtains issuance information by controlling the decryption section 60 so as to decrypt the encrypted issuance information (i.e., encryption issuance information) which is received from, for example, an issuing apparatus when the IC chip which is incorporated in the information processing apparatus 10 is issued. An authority key such as a system key which is stored at the data memory unit 180 or the key memory unit 190 is used for the decryption process of the issuance information.

The read/write unit 170 performs a process to read various data or to write various data from or to the memory section 80 which is illustrated in FIG. 4. For example, when a read request of user data for a predetermined service is received from the reader/writer 14, the read/write unit 170 reads the user data from a predetermined service defining area of the data memory unit 180. Further, for example, when a write request of user data for a predetermined service is received from the reader/writer 14, the read/write unit 170 writes the user data to a predetermined service defining area of the data memory unit 180. Herein, in the present embodiment, the read/write unit 170 is provided commonly to the plurality of encryption algorithm units 120. However, instead, it is also possible that the read/write unit 170 may be provided to each of the encryption algorithm units 120.

Herein, each of functions of the response detection unit 110, the first encryption algorithm unit 120A, the second encryption algorithm unit 120B and the read/write unit 170 may be performed by utilizing a computer program, for example. In this case, for example, the program for executing the functions is stored at the memory section 80 of FIG. 4 and a processor which structures the control section 70 executes the program. Instead, the program may be stored at a memory medium other than the memory section 80 or may be provided to the information processing apparatus 10 via a communication medium. Further, each of functions of the response detection unit 110, the first encryption algorithm unit 120A, the second encryption unit 120B and the read/write unit 170 may be performed by utilizing dedicated hardware (i.e., a processor, a circuit etc.).

Herein, the data memory unit 180 and the key memory unit 190 are realized by utilizing the memory section 80 of FIG. 4. The data memory unit 180 stores the user data which is used for providing various services, and the disabling control information 184 and the cipher-specific information 186 which are utilized for the disabling process of the encryption algorithm unit 120 in a hierarchical structure. As proposed in JP-A No. 2000-36021, for example, the logical file structure at the data memory unit 180 is structured by logically layering the defining area which is the memory area for managing information. On the other hand, the key memory unit 190 securely stores the cipher key such as the authority key which is used by each of the encryption algorithm units 120.

Up to here, the configuration of the information processing apparatus 10 according to the present embodiment has been described with reference to FIGS. 4 and 5. Next, an example of a data structure which is stored to the data memory unit 180 of the information processing apparatus 10 is described.

2-2. Example of Data Structure

Figure 6:
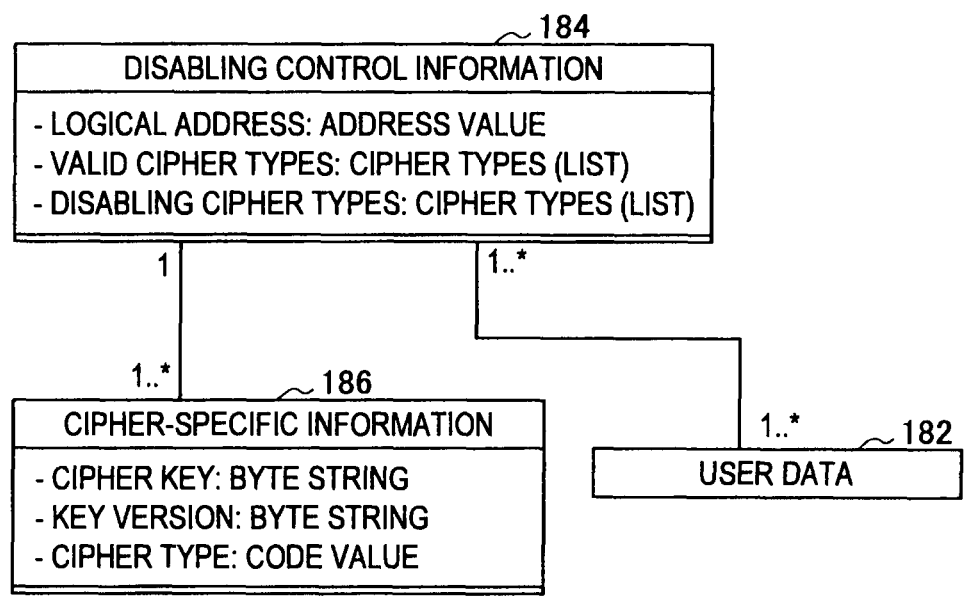
FIG. 6 is a schematic diagram which illustrates an example of a data structure to be stored at a data memory unit according to the first embodiment.

FIG. 6 is a schematic diagram which illustrates an example of a logical data structure of the user data 182, the disabling control information 184 and the cipher-specific information 186 which are stored at the data memory unit 180. Herein, FIG. 6 is illustrated in a class diagram of UML2.0.

As illustrated in FIG. 6, the disabling control information 184 and the cipher-specific information 186 are logically aligned in hierarchical structure at the data memory unit 180. More specifically, the relation between the disabling control information 184 and the cipher-specific information 186 is one-many relation. Namely, one or more of the cipher-specific information 186 may exist with respect to one of the disabling control information 184. Further, the relation between the disabling control information 184 and the user data 182 is one or more to one or more. Namely, one or more of the user data 182 may exist against one of the disabling control information 184, and then, one or more of the disabling control information 184 may exist against one of the user data 182.

The disabling control information 184 is control information for disabling at least one encryption algorithm unit among the plurality of encryption algorithm units 120. The disabling control information 184 includes a logical address, valid cipher types and disabling cipher types, for example. Herein, the logical address is used for accessing the disabling control information 184 within the memory section 80 of FIG. 4. The valid cipher types are the data for distinguishing a valid encryption method among the encryption methods which are used by the plurality of encryption algorithm units 120. Herein, the valid encryption method denotes the encryption method which is permitted by the information processing apparatus 10 for authentication with an external device. Namely, each of the encryption algorithm units 120 performs mutual authentication with an external device only in the case that the cipher type which is specified by the authentication request received from the external device is included in the valid cipher types in the disabling control information 184. The disabling cipher type is the data for distinguishing the cipher type which is to be automatically disabled at the information processing apparatus 10. For example, when the mutual authentication unit 140A of the first encryption algorithm unit 120A succeeds in a mutual authentication with an external device, the mutual authentication unit 140A obtains the disabling cipher type from the data memory unit 180 and deletes the cipher type which matches with the obtained disabling cipher type from the valid cipher types. Accordingly, mutual authentication with an external device may not be performed with the encryption method which is indicated by the deleted cipher type, so that one of the other cipher algorithm units 120 in the information processing apparatus 10 is disabled.

The cipher-specific information 186 is located at the lower of the disabling control information 184 and, for example, is provided to each of the cipher algorithm units 120. The cipher-specific information 186 includes a cipher key, a key version and a cipher type, for example. Herein, the cipher key is a key necessary for accessing a predetermined range of the memory area of the data memory unit 180. The key version is the data indicating the version of the abovementioned cipher key. The cipher type is the data for specifying the encryption method which is used by each of the encryption algorithm units 120 and, for example, is indicated by a predefined code value for each encryption method.

Figure 7:
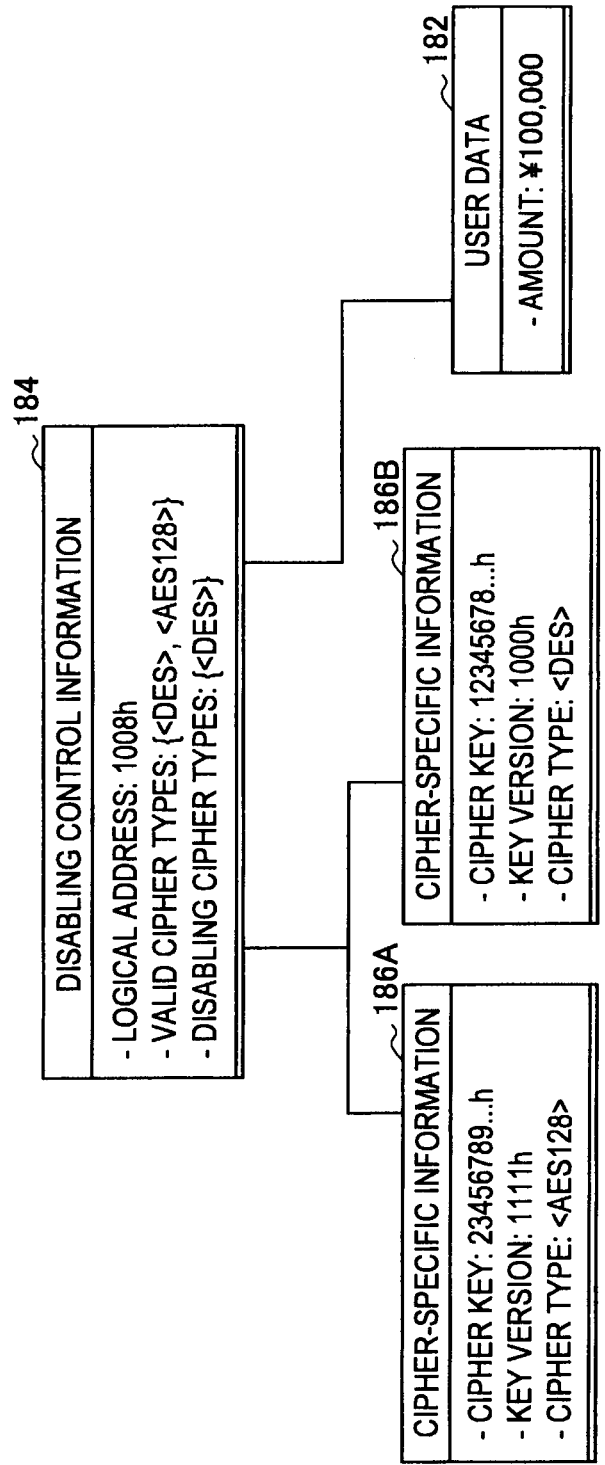
FIG. 7 is a schematic diagram which illustrates a specific data example of the data structure of FIG. 6.

FIG. 7 is a schematic diagram which illustrates a specific data example of the user data 182, the disabling control information 184 and the cipher-specific information 186 according to the present embodiment.

As illustrated in FIG. 7, two cipher types of DES and AES128 are included in the valid cipher types of the disabling control information 184 of the logical address 1008h. Further, DES is included in the disabling cipher types.

Then, cipher-specific information 186A corresponding to the first encryption algorithm unit 120A and cipher-specific information 186B corresponding to the second encryption algorithm unit 120B are defined at the lower of the disabling control information 184. Herein, in the cipher-specific information 186A, the cipher key is 23456789 . . . h, the key version is 1111h, and the cipher type is AES128. Further, in the cipher-specific information 186B, the cipher key is 12345678 . . . h, the key version is 1000h, and the cipher type is DES. The example indicates that the first encryption algorithm unit 120A supports mutual authentication by the AES128 method and the second encryption algorithm unit 120B supports mutual authentication by the DES method.

In addition, as an example of arbitrary data, amount data of ¥100000 is included in the user data 182.

With the data example, when the mutual authentication unit 140A of the first encryption algorithm unit 120A succeeds in a mutual authentication with an external device, for example, the mutual authentication unit 140A deletes DES which is specified as the disabling cipher type from the valid cipher types of the disabling control information 184 as described above. Accordingly, the second encryption algorithm unit 120B which supports the DES method becomes incapable of performing mutual authentication with an external device, so that the second encryption algorithm unit 120B is disabled.

Typically, a file system within an IC card is capable of actualizing a data structure which is logically layered so that a plurality of service providers can smoothly share the IC card and effectively manage various services. For example, JP-A No. 2000-36021 discloses a file system which is capable of managing the memory area for each of three layers of systems, areas and services. In the data structure which is logically layered as such, the disabling control information 184 and the cipher-specific information 186 which are illustrated in FIGS. 6 and 7 may be located at any layer provided the one-many, parent-child relation is maintained.

2-3. Process Flow

Next, flow of processes when the information processing apparatus 10 according to the present embodiment is accessed by an external device is described with reference to FIGS. 8 to 12.

Figure 8:
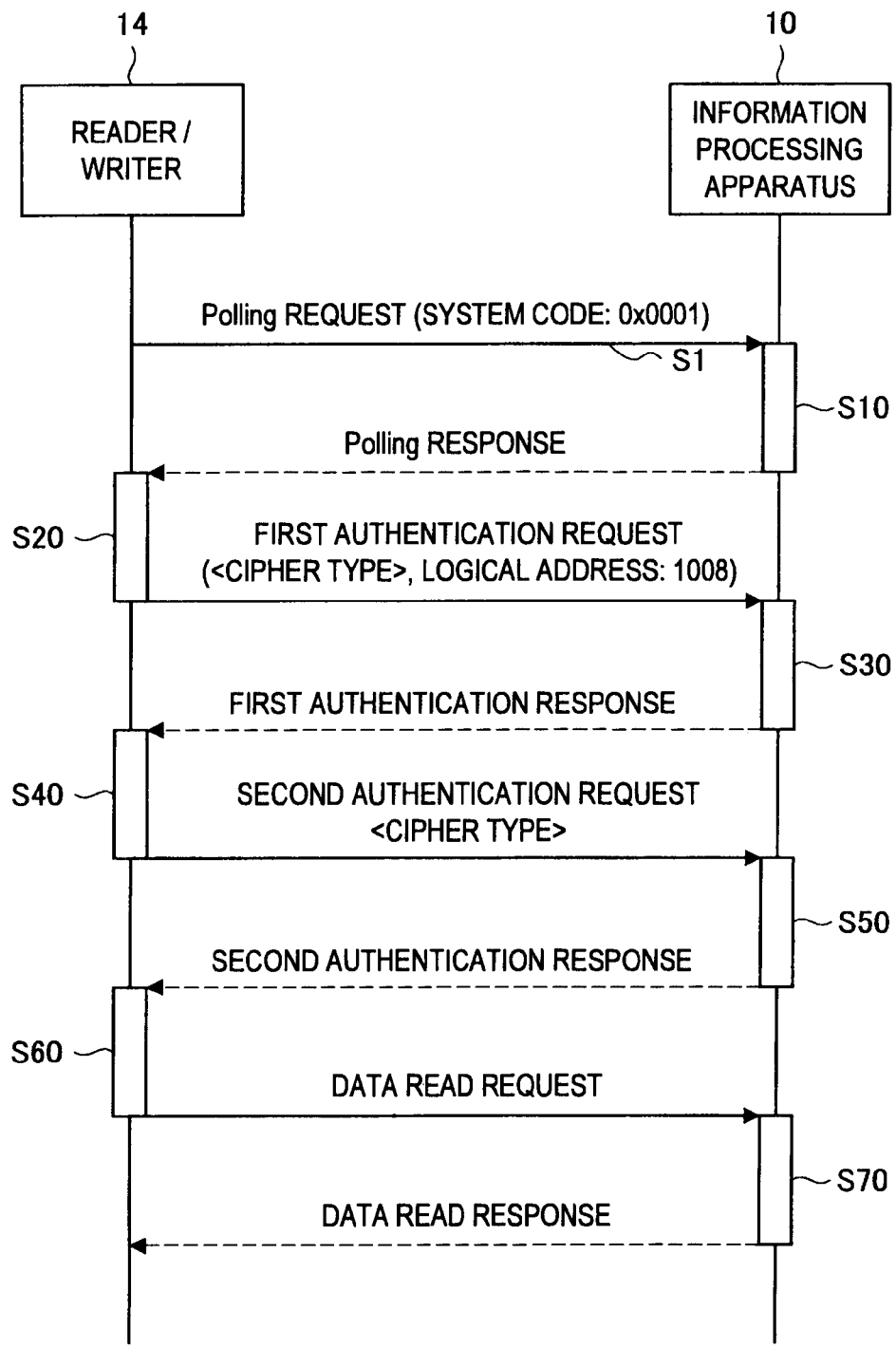
FIG. 8 is a sequence diagram which illustrates an example of access sequence between the information processing apparatus and a reader/writer.

FIG. 8 is a sequence diagram which illustrates an access sequence when the information processing apparatus 10 is accessed by the reader/writer 14.

The access to the information processing apparatus 10 is started when a user holds the information processing apparatus 10 within the communication range of the reader/writer 14 of the service providing apparatus 12, for example. When the user holds the information processing apparatus 10 within the communication range of the reader/writer 14, the information processing apparatus 10 is seized by the polling of the reader/writer 14 in steps S1 to S10. Then, a mutual authentication between the reader/writer 14 and the information processing apparatus 10 is performed and the communication path is encrypted in steps S20 to S50. Subsequently, predetermined instructions and responses of a service are exchanged between the reader/writer 14 and the information processing apparatus 10 in steps S60 to S70.

More specifically, first, the reader/writer 14 continues to transmit a polling request which specifies a system code 0x0001 in order to seize the information processing apparatus 10 in step S1, as illustrated in FIG. 8. Then, when the polling request is received, the information processing apparatus 10 having the IC card system which corresponds to the system code transmits a polling response to the reader/writer 14 in step S10.

Next, when the polling response is received from the information processing apparatus 10, the reader/writer 14 prepares a first authentication request and transmits to the information processing apparatus 10 in step S20. For example, the first authentication request specifies the cipher type which specifies the encryption method of the encryption algorithm to be used and the logical address 1008 which distinguishes a service. When the first authentication request is received from the reader/writer 14, then, the information processing apparatus 10 examines whether or not the cipher type specified by the received first authentication request is included in the valid cipher types stored at the data memory unit 180. Then, in the case that the specified cipher type is included in the valid cipher types, the information processing apparatus 10 prepares a first authentication response and transmits to the reader/writer 14 in step S30.

Further, when the first authentication response is received from the information processing apparatus 10, the reader/writer 14 prepares a second authentication request with the encryption algorithm of the specified encryption method and transmits to the information processing apparatus 10 in step S40. When the second authentication request is successfully received from the reader/writer 14, then, the information processing apparatus 10 examines whether or not the specified cipher type is included in the disabling cipher types. Then, in the case that the specified cipher type is not included in the disabling cipher types, the information processing apparatus 10 deletes the cipher type which matches with the disabling cipher type stored at the data memory unit 180 from the valid cipher types. Then, the information processing apparatus 10 prepares a second authentication response and transmits to the reader/writer 14 in step S50. As a result, the former encryption algorithm is disabled, for example, when the first authentication with the new encryption algorithm is successfully performed while mutual authentication between the reader/writer 14 and the information processing apparatus 10 is completed. Then, a session key for encrypting the communication path between the both is generated.

Subsequently, the reader/writer 14 encrypts a predetermined command for using a service (for example, a data read request) by using the session key and transmits to the information processing apparatus 10 in step S60. When the data read request is received from the reader/writer 14, the information processing apparatus 10 decrypts the encrypted data read request by using the session key and reads the user data specified by the data read request from the memory section 80. Then, the information processing apparatus 10 encrypts the read user data using the session key and transmits to the reader/writer 14 in step S70.

Figure 9:
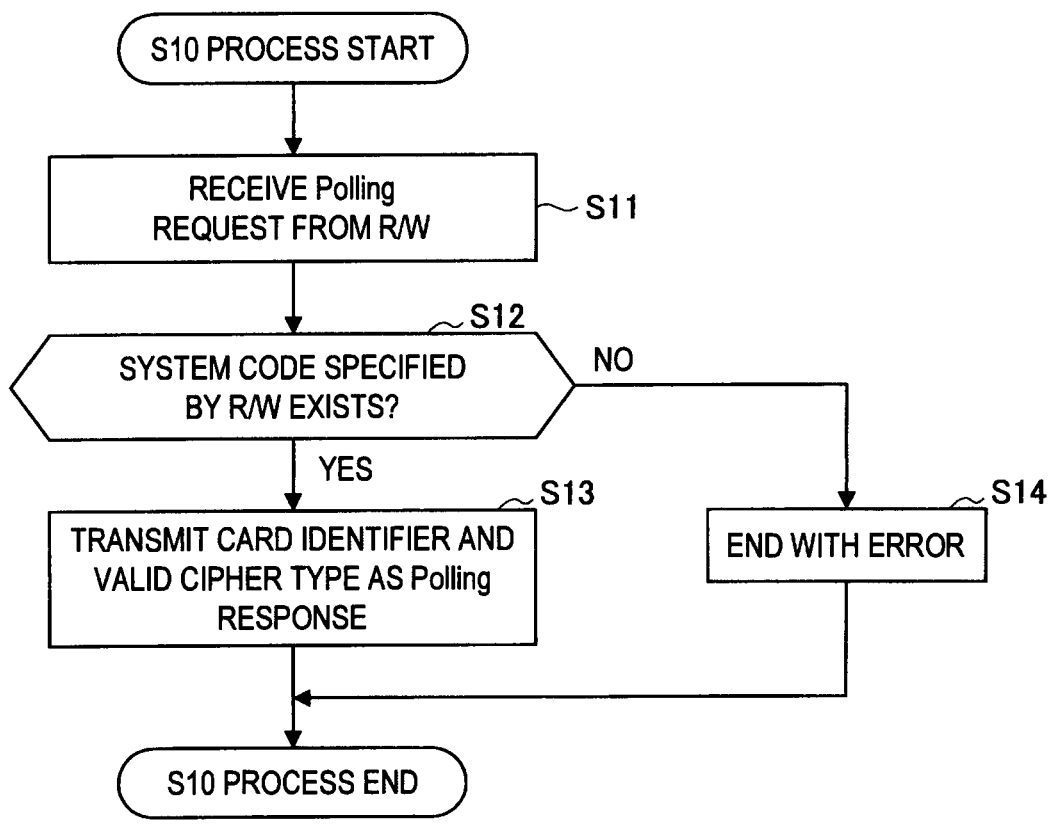
FIG. 9 is a flowchart which describes an example of detailed flow of a polling response process.
Figure 10:
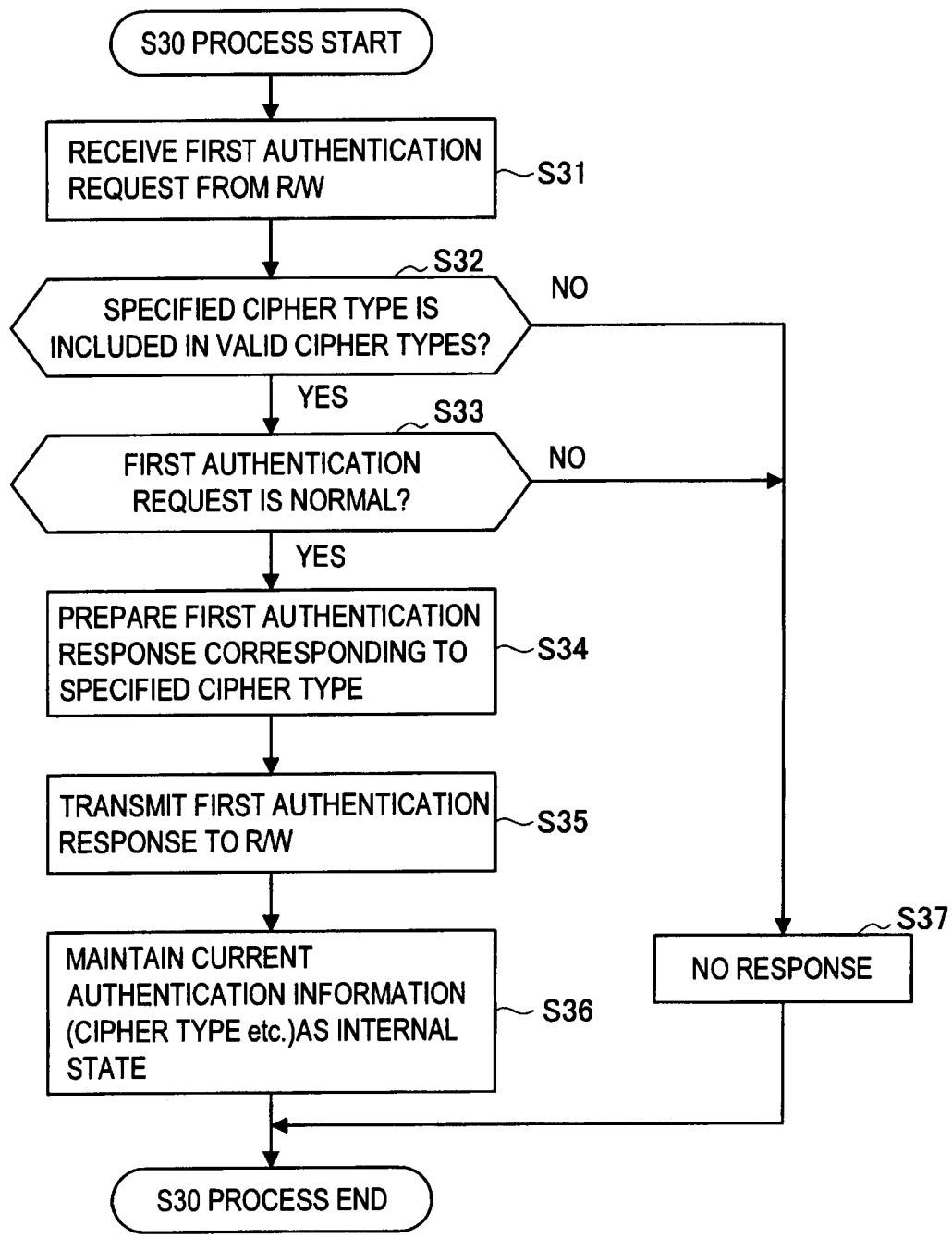
FIG. 10 is a flowchart which describes an example of detailed flow of a first authentication response process.
Figure 11:
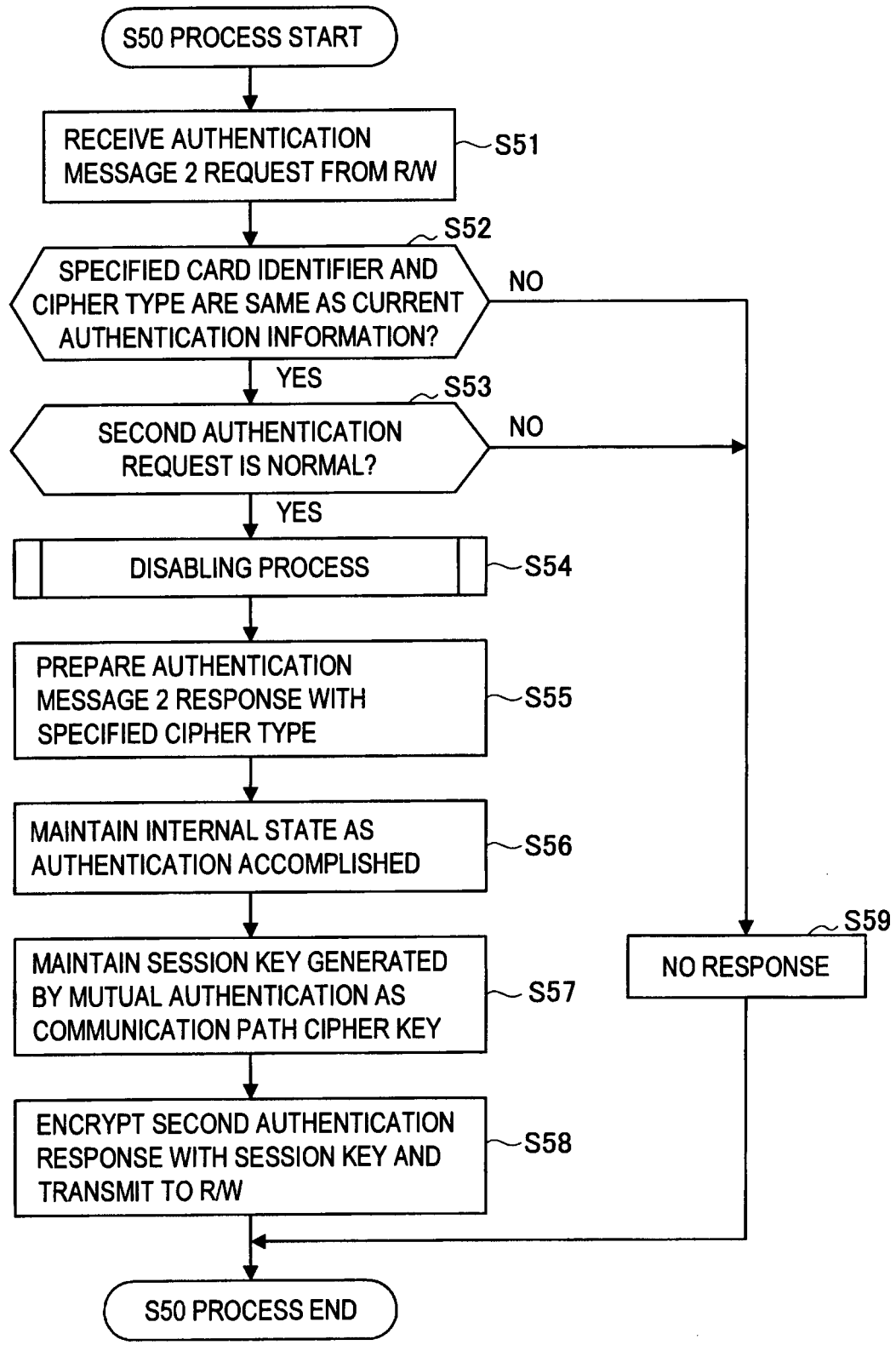
FIG. 11 is a flowchart which describes an example of detailed flow of a second authentication response process.

Next, each of the polling response process in step S10, the first authentication response process in step S30 and the second authentication response process in step S50 is described further in details with reference to FIGS. 9 to 11.

First, FIG. 9 is a flowchart which describes an example of detailed flow of the polling response process by the information processing apparatus 10 (i.e., S10 process in FIG. 8).

As described in FIG. 9, when the information processing apparatus 10 is held to the reader/writer 14, the information processing apparatus 10 receives the polling request from the reader/writer 14 in step S11. Then, the information processing apparatus 10 determines whether or not the system defining information which maintains a system code 0x0001, for example, specified by the polling request exists at the data memory unit 180 in step S12. The system code is common to the first encryption algorithm unit 120A and the second encryption algorithm unit 120B.

In the case that the system defining information corresponding to the system code does not exist as a result of the determination, the information processing apparatus 10 terminates the polling response process as an error and does not respond to the reader/writer 14 in step S14. On the other hand, in the case that the system defining information corresponding to the system code exists, the information processing apparatus 10 transmits a card identifier for identifying the information processing apparatus 10 and the valid cipher type to the reader/writer 14 as the polling response in step S13. Accordingly, the information processing apparatus 10 can notifies the cipher type which is capable of being used by the own apparatus to the reader/writer 14.

FIG. 10 is a flowchart which describes an example of detailed flow of the first authentication response process by the information processing apparatus 10 (i.e., S30 process in FIG. 8).

As described in FIG. 10, first, the information processing apparatus 10 receives the first authentication request from the reader/writer 14 in step S31. Accordingly, the information processing apparatus 10 obtains the cipher type and the logical address which are specified by the reader/writer 14 via the received first authentication request.

Next, the information processing apparatus 10 determines whether or not the specified cipher type is included in the valid cipher types stored at the data memory unit 180 in step S32. Further, the information processing apparatus 10 examines whether or not the first authentication request received from the reader/writer 14 is normal in step S33. Herein, in the case that the specified cipher type is not included in the valid cipher types or in the case that the received first authentication request is not normal, no response process is performed in step S37. On the other hand, in the case that the specified cipher type is included in the valid cipher types and the received first authentication request is normal, the process proceeds to step S34.

In step S34, the information processing apparatus 10 prepares the first authentication response by utilizing the encryption method which is indicated by the cipher type specified by the reader/writer 14. For example, in the case that the first encryption algorithm unit 120A and the second encryption algorithm unit 120B correspond respectively to AES128 and DES and AES128 is specified as the cipher type, the mutual authentication unit 140A of the first encryption algorithm unit 120A prepares the first authentication response. The first authentication response which is prepared accordingly includes the first random number and the second random number for the mutual authentication which are described relating to FIG. 5. Then, the information processing apparatus 10 transmits the prepared first authentication response to the reader/writer 14 in step S35.

Subsequently, the mutual authentication unit 140A of the first encryption algorithm unit 120A, for example, temporarily maintains the card identifier, the cipher type and the logical address which are specified by the reader/writer 14 at the memory area of the memory section 80 etc. as the internal state of the information processing apparatus 10 in step S36. Hereinafter, the temporarily stored information including the card identifier, the cipher type and the logical address is called current authentication information.

Herein, for example, when the power of the information processing apparatus 10 is switched off or when the information processing apparatus 10 receives a reset command from the reader/writer 14, the specified current authentication information which has been maintained is deleted. When changing the service provided between the information processing apparatus 10 and the reader/writer 14, the information processing apparatus 10 receives the reset command for resetting the previously maintained data.

Next, FIG. 11 is a flowchart which describes an example of detailed flow of the second authentication response process by the information processing apparatus 10 (i.e., S50 process in FIG. 8).

As described in FIG. 11, first, the information processing apparatus 10 receives the second authentication request (including the re-encrypted second random number) along with the specified card identifier and cipher type from the reader/writer 14 in step S51.

Next, in step S52, the information processing apparatus 10 determines whether or not the received card identifier and cipher type are the same as the data included in the current authentication information which is maintained at step S36. Further, the information processing apparatus 10 examines whether or not the received second authentication request is normal in step S53. Herein, in the case that the received card identifier and cipher type are not the same as the card identifier and cipher type included in the current authentication information or in the case that the received second authentication request is not normal, no response process is performed in step S59. On the other hand, in the case that the received card identifier and cipher type are the same as the card identifier and cipher type included in the current authentication information and the second authentication request is normal, the process proceeds to step S54.

Herein, the examination of whether or not the second authentication request is normal is performed by decrypting the second random number which is re-encrypted by the reader/writer 14 and by comparing the decrypted second random number with the second random number which is originally generated at the information processing apparatus 10.

Next, in step S54, the disabling process is performed in accordance with the disabling control information 184 which is stored at the data memory unit 180 by the mutual authentication unit 140 of the encryption algorithm unit 120 which corresponds to the specified cipher type.

Figure 12:
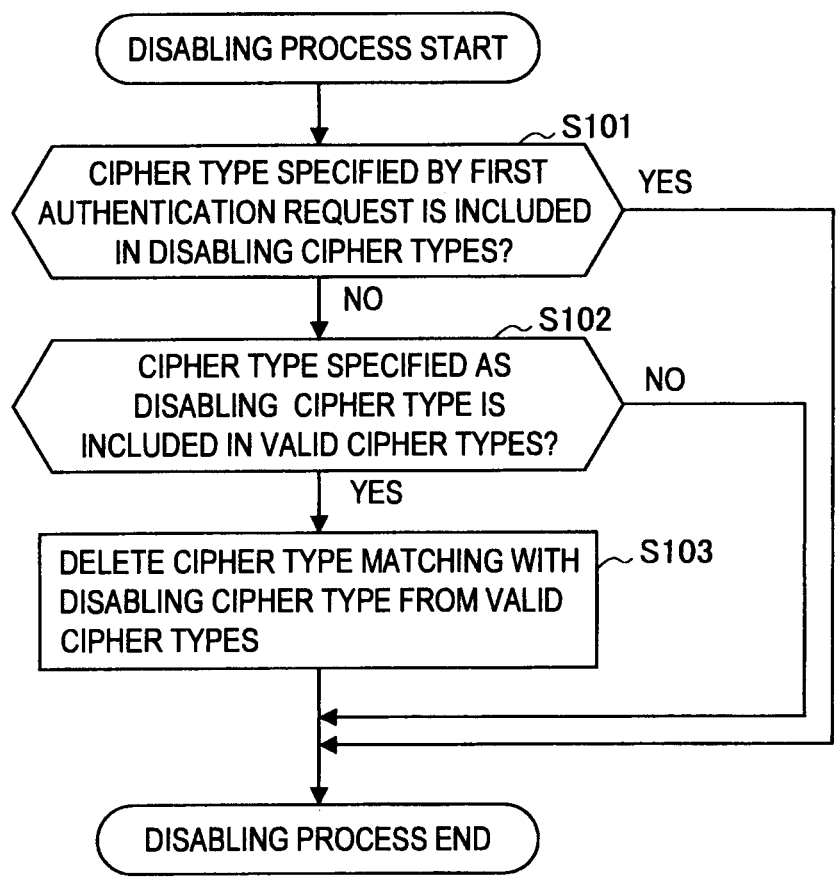
FIG. 12 is a flowchart which describes an example of detailed flow of a disabling process according to the first embodiment.

FIG. 12 is a flowchart which describes an example of detailed flow of the disabling process by the mutual authentication unit 140 of the encryption algorithm unit 120.

As described in FIG. 12, first, it is determined whether or not the cipher type specified by the first authentication request is included in the disabling cipher types stored at the data memory unit 180 in step S101. Herein, in the case that the cipher type specified by the first authentication request is included in the disabling cipher types, the following disabling process is skipped in order not to disable the own encryption algorithm unit 120 which corresponds to the cipher type. On the other hand, in the case that the cipher type specified by the first authentication request is not included in the disabling cipher types, the process proceeds to step S102.

Herein, for example, it is also possible that a typical cipher type specifying the encryption algorithm unit 120 which performs the disabling process is defined in the disabling control information 184 and proceeds to the subsequent process when the cipher type specified by the first authentication request matches with the typical cipher type in step S101.

Next, in step S102, it is determined whether or not the cipher type which is set as the disabling cipher type is included in the valid cipher types included in the disabling control information 184 in step S102. Herein, in the case that the cipher type set as the disabling cipher type is not included in the valid cipher types, the encryption algorithm unit 120 to be disabled is already disabled. Therefore, the subsequent disabling process is skipped. On the other hand, in the case that the cipher type set as the disabling cipher type is included in the valid cipher types, the process proceeds to step S103.

Next, in step S103, the cipher type matching with the cipher type set as the disabling cipher type is deleted from the valid cipher types. Accordingly, the encryption algorithm unit 120 which supports the encryption method indicated by the deleted cipher type becomes incapable of performing mutual authentication with an external device thereafter. Then, the disabling process of FIG. 12 ends.

Herein, the disabling process described with reference to FIG. 12 is not necessarily incorporated in all of the encryption algorithm units 120. For example, it is assumed that the first encryption algorithm unit 120A which supports the new encryption algorithm and the second encryption algorithm unit 120B which supports the former encryption algorithm are provided to the information processing apparatus 10. In this case, the disabling process of FIG. 12 does not have to be incorporated in the second encryption algorithm unit 120B which supports the former encryption algorithm. Namely, in the case that the cipher type which indicates the encryption method of the former encryption algorithm is specified to the information processing apparatus 10 from the reader/writer 14, step S54 is not necessary to be executed among the second authentication response process of FIG. 11.

Returning to FIG. 11, description of the second authentication response process by the information processing apparatus 10 is continued. When the disabling process is completed, the information processing apparatus 10 prepares the second authentication response by utilizing the encryption method indicated by the cipher type specified by the reader/writer 14 in step S55. The second authentication response is a message to notify completion of the mutual authentication to the reader/writer 14. Further, the information processing apparatus 10 temporarily maintains information which indicates completion of the mutual authentication with the reader/writer 14 at the memory area of the memory section 80 etc. as the internal state in step S56.

Next, the information processing apparatus 10 maintains the key generated during the mutual authentication (i.e., the session key) as a communication path cipher key in step S57. Subsequently, the information processing apparatus 10 transmits the second authentication response prepared in step S55 to the reader/writer 14 after encrypting with the session key in step S58.

2-4. Transition Procedure Capable of being Actualized by the Present Embodiment Up to here, the information processing apparatus 10 according to the first embodiment of the present invention has been described with reference to FIGS. 4 to 12. According to the present embodiment, the information processing apparatus 10 is provided with the first encryption algorithm unit 120A which supports the new encryption algorithm and the second encryption algorithm unit 120B which supports the former encryption algorithm, for example. Then, when a mutual authentication with an external device firstly succeeds by utilizing the new encryption algorithm, the second encryption algorithm unit 120B which supports the former encryption algorithm can be automatically disabled by the first encryption algorithm unit 120A.

Figure 13:
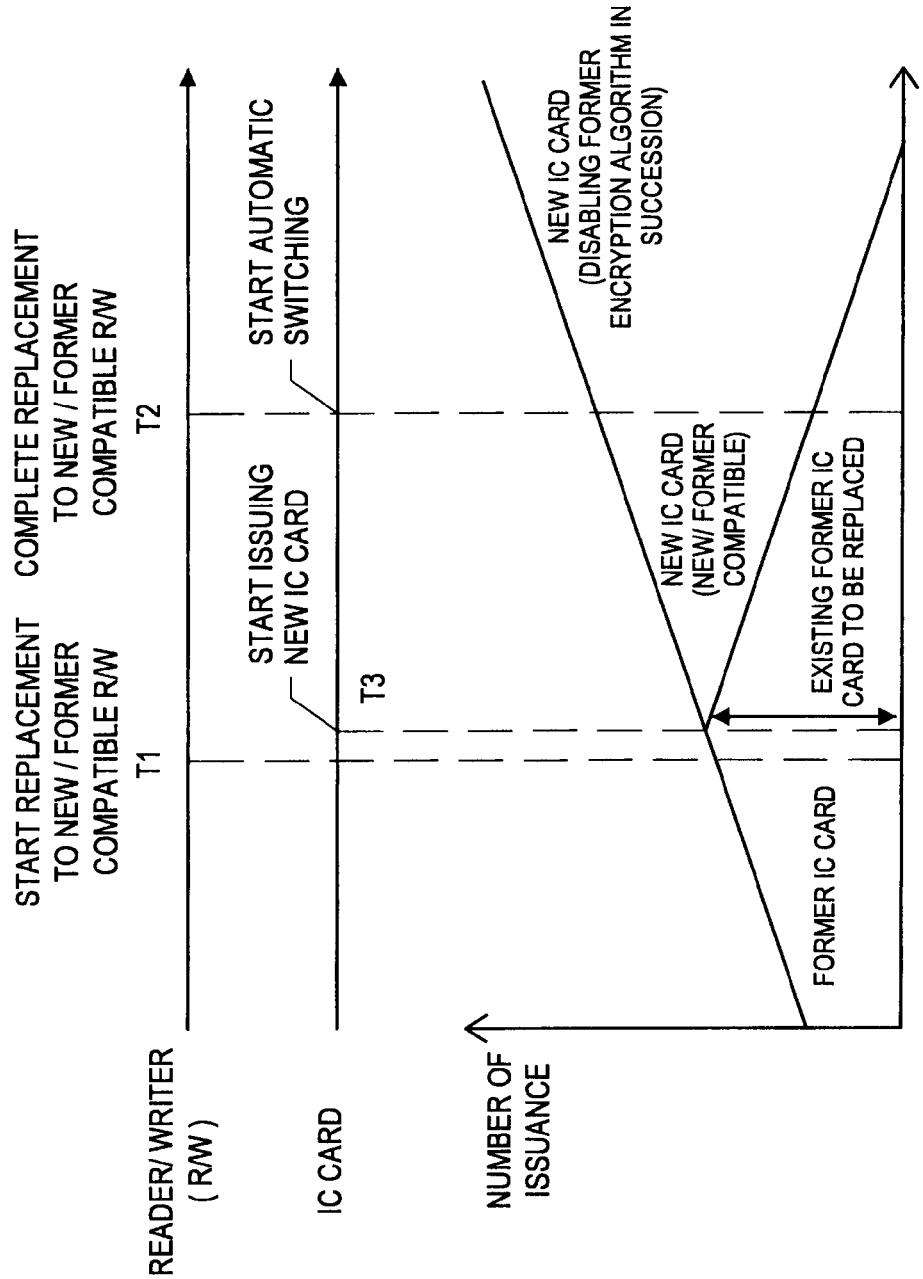
FIG. 13 is a schematic diagram which illustrates the relation between a new transition procedure of IC card encryption algorithm and the number of IC card issuance.

The abovementioned configuration enables transition procedure of the encryption algorithm of the IC card as illustrated in FIG. 13, for example. Namely, a service provider can issue a new IC card (i.e., corresponding to the information processing apparatus 10) to a user before timing T2 of completion of replacing all of the reader/writers which are used by service providers to new devices. Issuing timing T3 of the new IC card may be arbitrary timing after the specification of the new encryption algorithm between the reader/writer and the IC card is confirmed. Thus, mutual authentication with the new encryption algorithm by the reader/writer is started after the timing T2 of completion of replacing the reader/writers. Accordingly, when the user performs mutual authentication with the new IC card firstly after the timing T2, the former encryption algorithm in the new IC card with which mutual authentication is successfully performed is disabled without an additional process. As a result, security strength of the new IC card is enhanced to that of the new encryption algorithm. In this manner, switching of the encryption algorithm of the IC card is completed. Herein, since the former encryption algorithm in the new IC card remains valid until mutual authentication with the new encryption algorithm is performed, the user can use the reader/writer which supports the former encryption algorithm.

Figure 2:
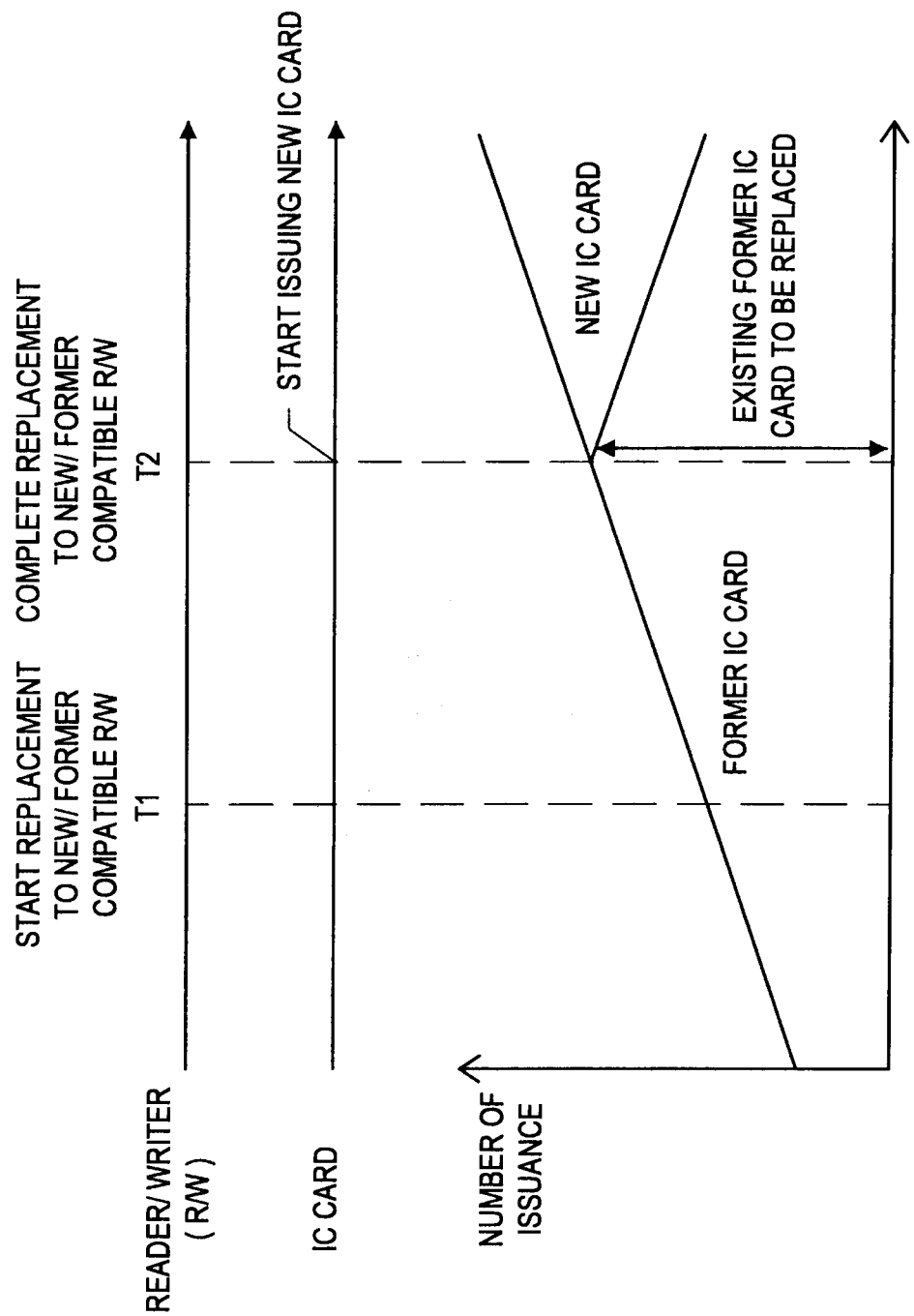
FIG. 2 is a schematic diagram which illustrates the relation between the transition procedure of FIG. 1 and the number of IC card issuance.

By actualizing such transition procedure, the timing of starting issuance of new IC cards can be advanced compared to that of transition procedure which is illustrated in FIG. 2. Thus, a user who purchases an IC card within the term between T3 and T2 of FIG. 13, for example, may not be urged to change the IC card for switching the encryption algorithm. Further, the number of the former IC cards to be targets of IC card replacing operation is suppressed and the process to switch the encryption algorithm of new IC cards becomes inessential. Accordingly, the service providers can enjoy a merit of lightening operational burden for the encryption algorithm transition.

3. Description of Modified Example

3-1. First Modified Example

The first embodiment has been described with the example in which the valid cipher types and the disabling cipher types are maintained at the same layer in FIGS. 6 and 7. However, the valid cipher types and the disabling cipher types are not necessarily located at the same layer. Herein, an example in which the valid cipher types are maintained at a lower layer than the layer of the disabling cipher types is described as the first modified example.

Figure 14:
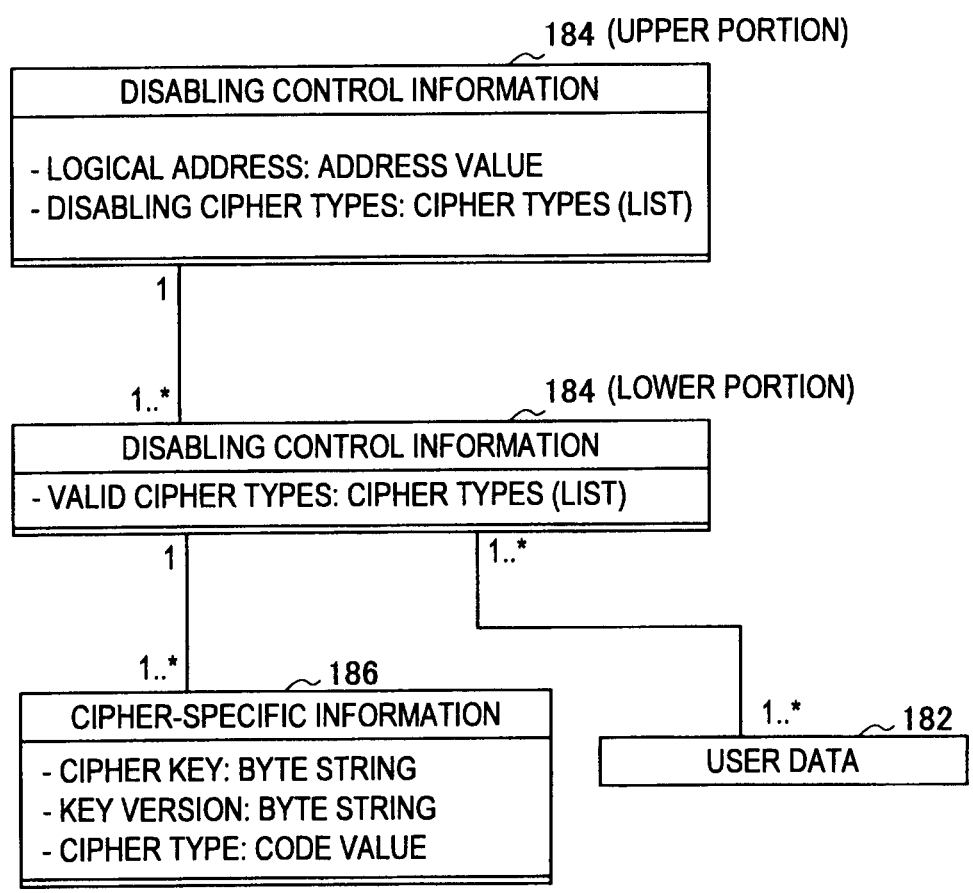
FIG. 14 is a schematic diagram which illustrates another example of the data structure to be stored at the data memory unit.

FIG. 14 is a schematic diagram which illustrates a logical data structure of the user data 182, the disabling control information 184 and the cipher-specific information 186 which are stored at the data memory unit 180 according to the present modified example.

As illustrated in FIG. 14, the disabling control information 184 is further divided into two layers in the data memory unit 180 so that the relation between the disabling cipher types and the valid cipher types is one-many relation. Namely, one or more valid cipher types may exist against one of the disabling cipher types. Then, one or more cipher-specific information and user data are defined respectively with respect to each of the valid cipher types. This data structure is effective for the case to separately control strength of the encryption algorithm permitted for each of the services within a single IC card system (or within a single service provider) and the like.

Figure 15:
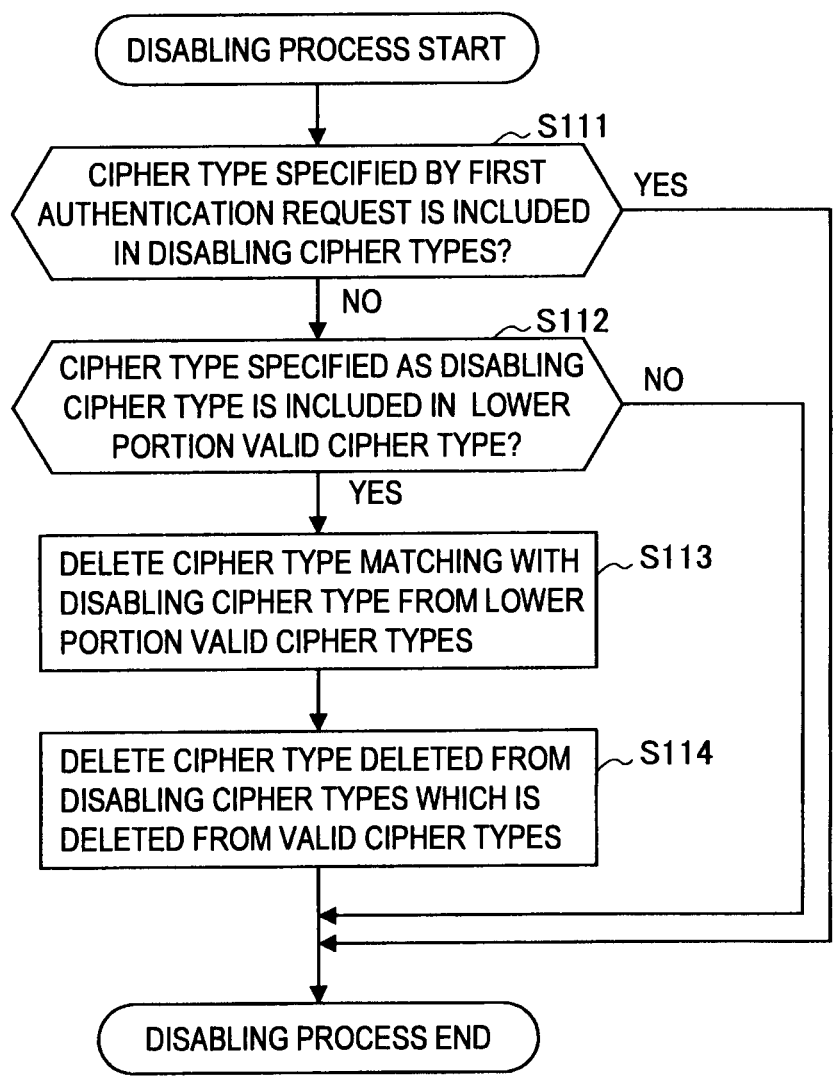
FIG. 15 is a flowchart which describes another example of detailed flow of the disabling process.

FIG. 15 is a flowchart which describes an example of detailed flow of the disabling process by the mutual authentication unit 140 of the encryption algorithm unit 120 according to the present modified example.

As described in FIG. 15, first, it is determined whether or not the cipher type specified by the first authentication request is included in the disabling cipher types stored at the data memory unit 180 in step S111. Herein, in the case that the cipher type specified by the first authentication request is included in the disabling cipher types, the following disabling process is skipped in order not to disable the own encryption algorithm unit 120 which corresponds to the cipher type. On the other hand, in the case that the cipher type specified by the first authentication request is not included in the disabling cipher types, the process proceeds to step S112.

Next, in step S112, it is determined whether or not the cipher type which is set as the disabling cipher type is included in any valid cipher types of the lower portion in step S112. Herein, in the case that the cipher type set as the disabling cipher type is not included in any valid cipher types of the lower portion, the subsequent disabling process is skipped. On the other hand, in the case that the cipher type set as the disabling cipher type is included in any valid cipher types, the process proceeds to step S113.

Next, in step S113, the cipher type matching with the cipher type set as the disabling cipher type is deleted from the valid cipher types of the lower portion of the disabling control information 184. Accordingly, the encryption algorithm unit 120 which supports the encryption method indicated by the deleted cipher type becomes incapable of performing mutual authentication with an external device thereafter.

Next, in step S114, the cipher type deleted from the valid cipher types is deleted from the disabling cipher types of the disabling control information 184. Accordingly, a process of searching for the cipher type which is previously deleted from the valid cipher types at the lower portion of the disabling control information 184 (i.e., corresponding to step S112 of FIG. 15) thereafter can be avoided. Then, the disabling process according to the present modified example ends.

3-2. Second Modified Example

The first embodiment has been described with the example in which the respective encryption methods for mutual authentication with an external device of the first encryption algorithm unit 120A and the second encryption algorithm unit 120B are different each other. However, the present invention is applicable to cases that encryption methods for mutual authentication with an external device are common for both of the first encryption algorithm unit 120A and the second encryption algorithm unit 120B and only generations of the cipher key are different from each other. In the following, an example to support two encryption algorithms of which generations are different each other is described as the second modified example.

Figure 16:
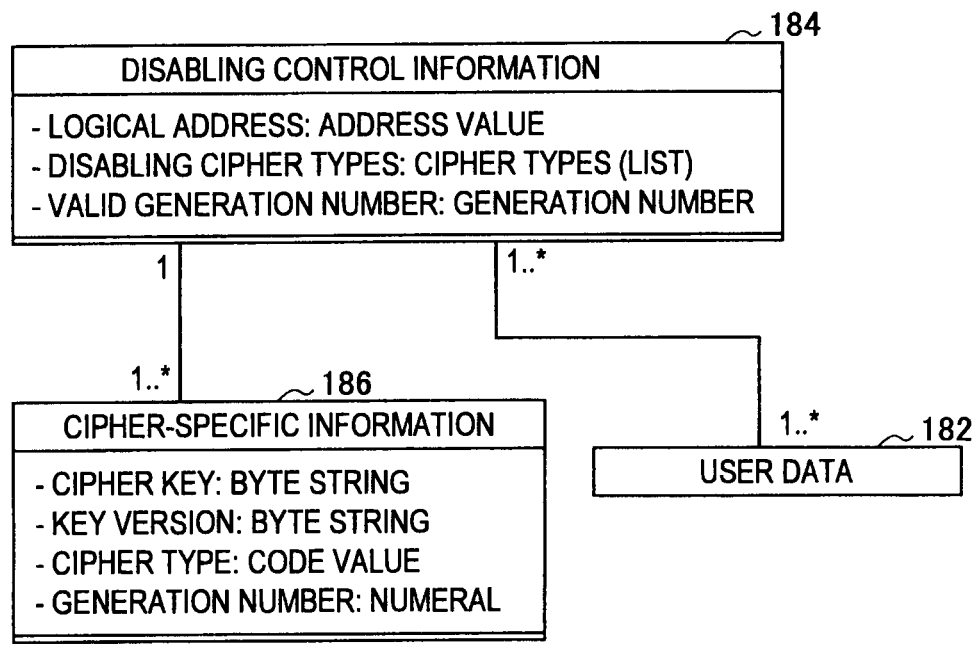
FIG. 16 is a schematic diagram which illustrates another example of the data structure to be stored at the data memory unit.

FIG. 16 is a schematic diagram which illustrates a logical data structure of the user data 182, the disabling control information 184 and the cipher-specific information 186 stored in the data memory unit 180 according to the present modified example.

As illustrated in FIG. 16, the disabling control information 184 includes the logical address, the disabling cipher types and valid generation number, for example. The logical address is used for accessing the disabling control information 184 in the memory section 80 of FIG. 4. The disabling cipher types are the data for distinguishing the encryption method to be automatically disabled at the information processing apparatus 10. The valid generation number is the data for distinguishing the generation number of the valid cipher key of which generation is the oldest (i.e., the generation number is the smallest) among the cipher keys which are used by the plurality of encryption algorithm units 120.

As illustrated in FIG. 16, the cipher-specific information 186 includes the cipher key, the key version, the cipher type and the generation number, for example. The generation number is the data which is additionally included in the present modified example and specifies the generation of the cipher key which is used by each of the encryption algorithm units 120.

Figure 17:
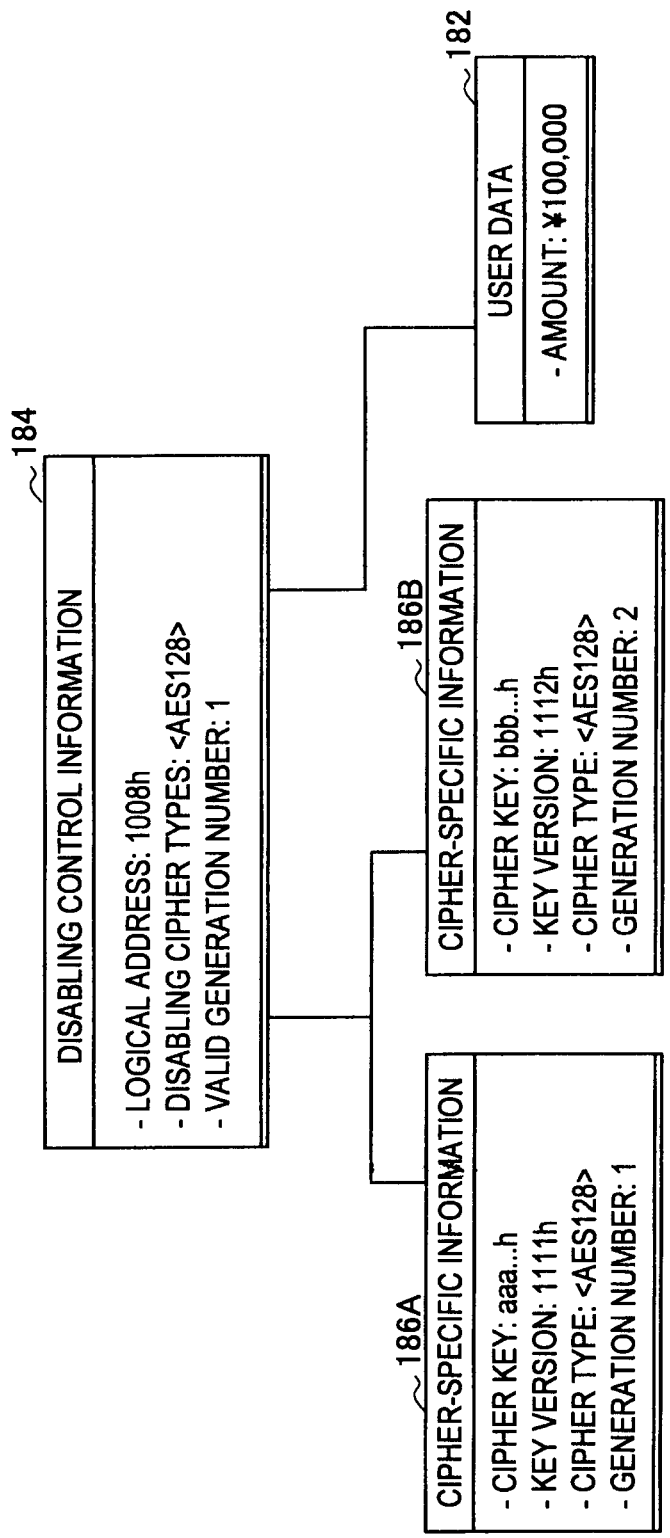
FIG. 17 is a schematic diagram which illustrates a specific data example of the data structure of FIG. 16.

FIG. 17 is a schematic diagram which illustrates a specific data example of the user data 182, the disabling control information 184 and the cipher-specific information 186 according to the present modified example.

As illustrated in FIG. 17, AES128 is included in the disabling cipher types of the disabling control information 184 of the logical address 1008h. Further, the valid generation number indicates 1.

Further, the cipher-specific information 186A which corresponds to the first encryption algorithm 120A and the cipher-specific information 186B which corresponds to the second encryption algorithm 120B are defined at the lower portion of the disabling control information 184. In the cipher-specific information 186A, the cipher key is aaa ... h, the key version is 1111h, the cipher type is AES128 and the generation number is 1. Then, in the cipher-specific information 186B, the cipher key is bbb ... h, the key version is 1112h, the cipher type is AES128 and the generation number is 2. The example indicates that the generation of the cipher key for the second encryption algorithm unit 120B is newer while both of the first encryption algorithm unit 120A and the second encryption algorithm unit 120B support mutual authentication with the AES128 method.

In the present modified example, an external device such as the reader/writer 14 which accesses the information processing apparatus 10 specifies the generation number of the cipher key to be used in addition to the cipher type and the logical address of FIG. 8 in the first authentication request. Then, only in the case that the generation number specified by the first authentication request is not smaller than the valid generation number in the disabling control information 184 (i.e., in the case that the generation is not older), each of the encryption algorithm units 120 performs mutual authentication with the reader/writer 14. For example, with the data example of FIG. 17, since the valid generation number is 1, the first encryption algorithm unit 120A of which generation number is 1 and the second encryption algorithm unit 120B of which generation number is 2 are both valid. On the contrary, when the valid generation number is updated to 2 by the disabling process which is described in the following, the first encryption algorithm unit 120A of which generation number is 1 is disabled.

Figure 18:
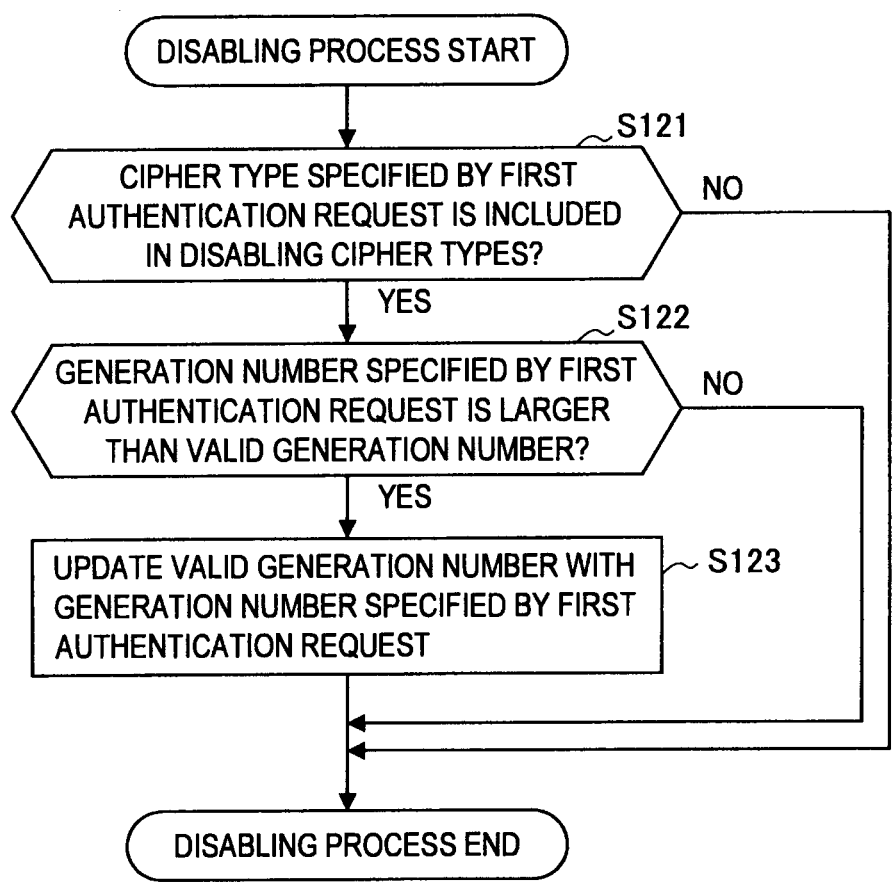
FIG. 18 is a flowchart which describes another example of detailed flow of the disabling process.

FIG. 18 is a flowchart which describes an example of a detailed flow of the disabling process by the mutual authentication unit 140 of the encryption algorithm unit 120 according to the present modified example.

As illustrated in FIG. 18, first, it is determined whether or not the cipher type specified by the first authentication request is included in the disabling cipher types stored at the data memory unit 180 in step S121. Herein, in the case that the cipher type specified by the first authentication request is not included in the disabling cipher types, the following disabling process based on the generation number is skipped. On the other hand, in the case that the cipher type specified by the first authentication request is included in the disabling cipher types, the process proceeds to step S122.

Next, in step S122, it is determined whether or not the generation number specified by the first authentication request is larger than the valid generation number included in the disabling control information 184. Herein, in the case that the generation number specified by the first authentication request is not larger than the valid generation number, the following disabling process is skipped. On the other hand, in the case that the generation number specified by the first authentication request is larger than the valid generation number, the process proceeds to step S123.

Next, in step S123, the valid generation number is updated with the generation number specified by the first authentication request. For example, with the data example of FIG. 17, the cipher type of AES128 and the generation number of 2 is newly specified. Then, when mutual authentication succeeds, the valid generation number of the disabling control information 184 is updated with 2. Accordingly, the first encryption algorithm unit 120A which uses the cipher key of which generation number is 1 becomes incapable of performing mutual authentication with an external device thereafter. Then, the disabling process according to the present modified example ends.

Herein, in the present modified example, the numeral which specifies the generation of the cipher key is used as the generation number. However, it is also possible to use the key version instead of the numeral.

3-3. Third Modified Example

In the first embodiment and the first and the second modified examples, examples in which the disabling process is performed at the information processing apparatus 10 when the normal mutual authentication using the new encryption algorithm firstly succeeds have been described. However, it is also possible to perform the disabling process at the information processing apparatus 10 only when a special authentication request is received while distinguishing the authentication request for performing the disabling process from the normal authentication request. Then, an example in which the disabling process is performed only when the special authentication request is received is described as a third modified example.

In the present modified example, an address conversion table for converting the logical address specified by the first authentication request is previously maintained, for example, at the memory section 80 of FIG. 4. FIG. 19 is an explanatory table which shows an example of the address conversion table 82 according to the present modified example.

As shown in FIG. 19, the address conversion table 82 includes the first row which defines logical addresses for normal authentication request and the second row which defines logical addresses for requesting to perform the disabling process against the logical addresses defined at the first row. For example, in FIG. 19, the logical address for the disabling process against the logical address 0000 for the normal authentication request is 0180. Further, the logical address for the disabling process against the logical address 0001 for the normal authentication request is 0181. Then, the logical address for the disabling process against the logical address 1008 for the normal authentication request is 1182.

In the case that the authentication request which specifies the logical address for the disabling process is received, for example, the information processing apparatus 10 reads the logical address to replace to the logical address for the normal authentication request by using the address conversion table 82 and performs the access sequence of FIG. 8. However, in the second authentication request process by the information processing apparatus 10 in FIG. 11 (i.e., S50 process in FIG. 8), it is additionally determined whether or not the logical address specified by the authentication request is the logical address for the disabling process before the disabling process of step S54. Then, only in the case that the logical address specified by the authentication request is the logical address for the disabling process, the disabling process described with reference to FIG. 12 etc. is performed.

By preparing the special logical address for the disabling process (i.e., a service identifier), service providers can adjust the switching timing of the encryption algorithm of IC cards to arbitrary timing after new encryption algorithm is supported by reader/writers.

4. Description of Second Embodiment

The example in which two encryption algorithms are supported at the information processing apparatus 10 which corresponds to the IC card has been described in the first embodiment. Herein, an example in which more encryption algorithms are supported is described in the second embodiment of the invention.

4-1. Configuration Example of Information Processing Apparatus

The physical configuration of the information processing apparatus 20 according to the present embodiment is similar to the configuration of the information processing apparatus 10 of the first embodiment which is illustrated in FIG. 4. Further, similar to the information processing apparatus 10 according to the first embodiment, the information processing apparatus 20 corresponds to an IC card or a portable terminal on which an IC chip is incorporated as illustrated in FIG. 3, for example.

Figure 20:
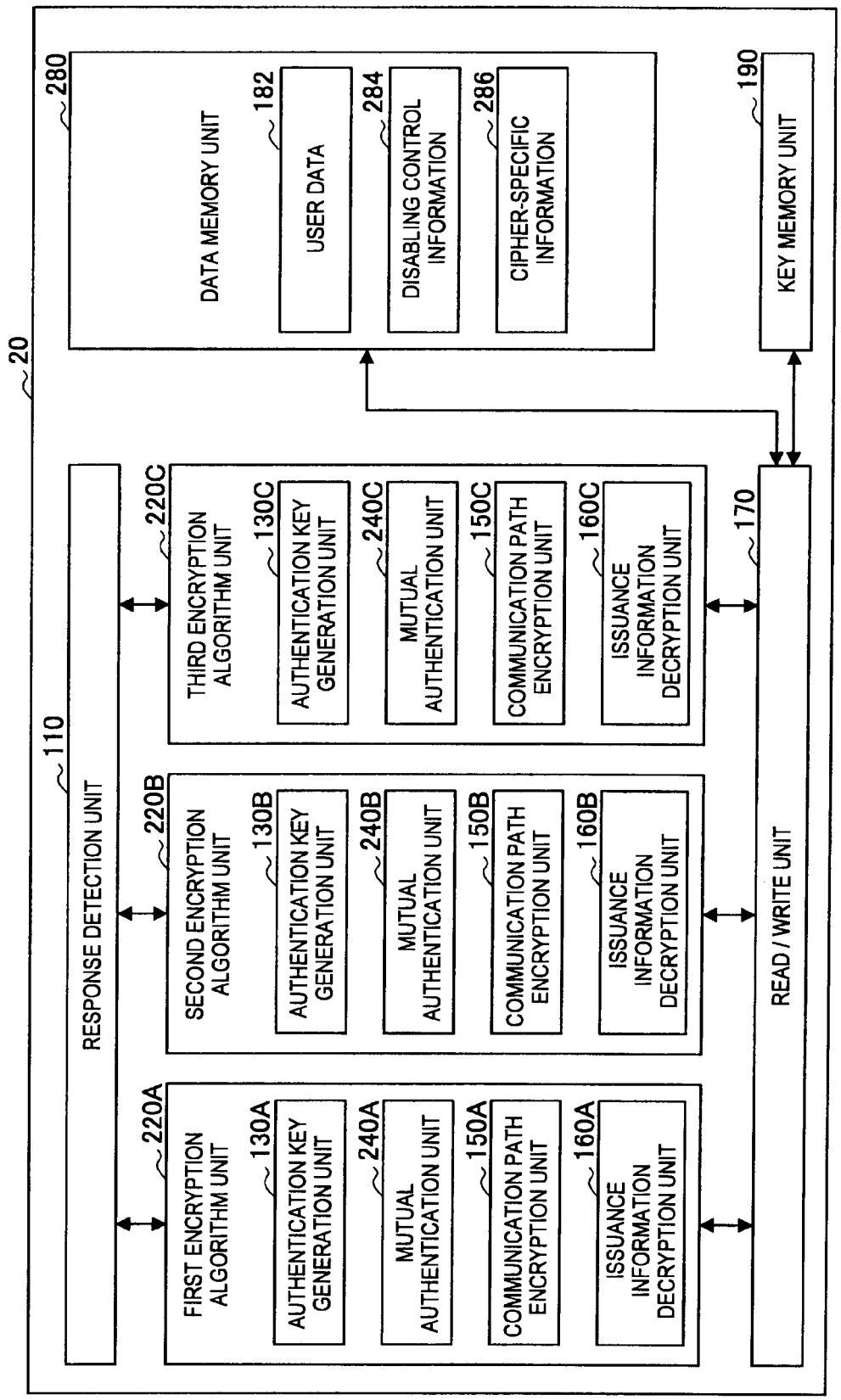
FIG. 20 is a block diagram which illustrates a logical structure of an information processing apparatus according to a second embodiment.

FIG. 20 is a block diagram which illustrates a logical configuration of the information processing apparatus 20 according to the present embodiment. As illustrated in FIG. 20, the information processing apparatus 20 includes a response detection unit 110, a first encryption algorithm unit 220A, a second encryption algorithm unit 220B, a third encryption algorithm unit 220C, a read/write unit 170, a data memory unit 280 and a key memory unit 190. Further, each of the encryption algorithm units 220 includes an authentication key generation unit 130, a mutual authentication unit 240, a communication path encryption unit 150 and an issuance information decryption unit 160.

In the present embodiment, the mutual authentication unit 240 of each of the encryption algorithm units 220 performs mutual authentication with external devices. Similar to the mutual authentication unit 140 according to the first embodiment, a method which is disclosed in JP-A No. H10-020780 or proposed in ISO/IEC9798 may be used as a mutual authentication method, for example. Further, a mutual authentication process by the mutual authentication unit 240 is performed by one of the encryption algorithm units 220 in accordance with the cipher type or the generation number which is specified by the authentication request from an external device.

Further, when at least one of the mutual authentication units 240 of the plurality of encryption algorithm units 220 succeeds in mutual authentication with an external device, the mutual authentication unit 240 disables another encryption algorithm unit 220 in accordance with the disabling control information 284 which is stored at the data memory unit 280. For example, in the present embodiment, the mutual authentication unit 240A of the first encryption algorithm unit 220A and the mutual authentication unit 240B of the second encryption algorithm unit 220B are capable of performing the later-mentioned disabling process. The disabling process is described later further in details.

4-2. Example of Data Structure

Figure 21:
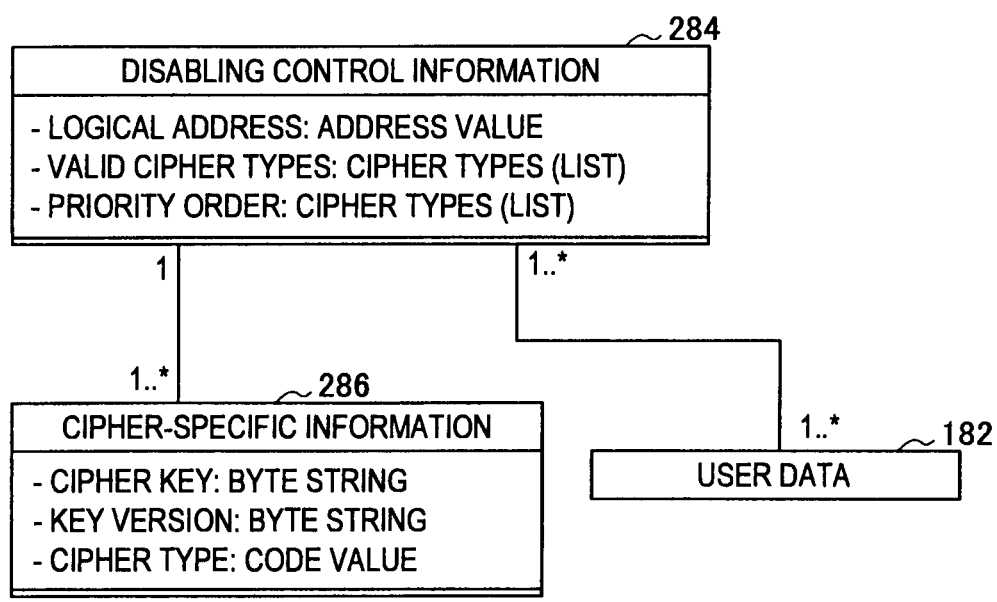
FIG. 21 is a schematic diagram which illustrates an example of the data structure to be stored at the data memory unit according to the second embodiment.

FIG. 21 is a schematic diagram which illustrates an example of a logical data structure of the user data 182, the disabling control information 284 and the cipher-specific information 286 which are stored at the data memory unit 280.

As illustrated in FIG. 21, the disabling control information 284 and the cipher-specific information 286 are logically aligned in hierarchical structure at the data memory unit 280. More specifically, the relation between the disabling control information 284 and the cipher-specific information 286 is one-many relation. Namely, one or more of the cipher-specific information 286 may exist with respect to one of the disabling control information 284. Further, the relation between the disabling control information 284 and the user data 182 is one or more to one or more.

The disabling control information 284 includes a logical address, valid cipher types and a priority order, for example. Herein, the logical address is used for accessing the disabling control information 284. The valid cipher types are the data for distinguishing valid encryption methods among the encryption methods which are used by the plurality of encryption algorithm units 220. Each of the encryption algorithm units 220 performs mutual authentication with an external device only in the case that the cipher type which is specified by the authentication request received from an external device is included in the valid cipher types in the disabling control information 284. The priority order is the data which is predefined in accordance with the security strength of each of the encryption algorithm units 220 and used for the later-mentioned disabling process of the encryption algorithm.

The cipher-specific information 286 includes a cipher key, a key version and a cipher type, for example. Herein, the cipher key is a key necessary for accessing a predetermined range of the memory area of the data memory unit 280. The key version is the data indicating the version of the above-mentioned cipher key. The cipher type is the data for specifying the encryption method which is used by each of the encryption algorithm units 220 and, for example, is indicated by a predefined code value for each encryption method.

Figure 22:
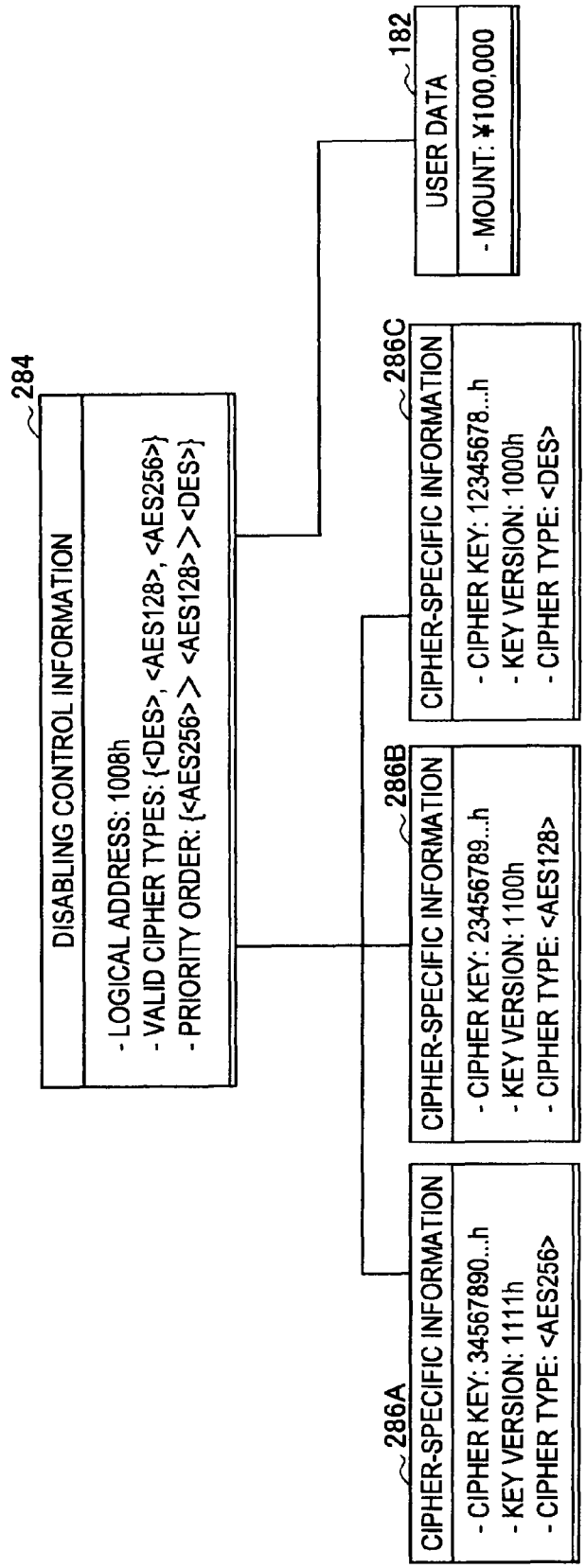
FIG. 22 is a schematic diagram which illustrates a specific data example of the data structure of FIG. 21.

FIG. 22 is a schematic diagram which illustrates a specific data example of the user data 182, the disabling control information 284 and the cipher-specific information 286 according to the present embodiment.

As illustrated in FIG. 22, three cipher types of DES, AES128 and AES256 are included in the valid cipher types of the disabling control information 284 of the logical address 1008h. Further, the priority order is AES256, AES128 and DES (i.e., AES256>AES128>DES).

Cipher-specific information 286A corresponding to the first encryption algorithm unit 220A, cipher-specific information 286B corresponding to the second encryption algorithm unit 220B and cipher-specific information 286C corresponding to the third encryption algorithm unit 220C are defined at the lower portion of the disabling control information 284. Herein, in the cipher-specific information 286A, the cipher key is 34567890 . . . h, the key version is 1111h, and the cipher type is AES256. Further, in the cipher-specific information 286B, the cipher key is 23456789 . . . h, the key version is 1100h, and the cipher type is AES128. Further, in the cipher-specific information 286C, the cipher key is 12345678 . . . h, the key version is 1000h, and the cipher type is DES.

With the data example, when the mutual authentication unit 240B of the second encryption algorithm unit 220B succeeds in mutual authentication with an external device, for example, the mutual authentication unit 240B deletes DES of which priority order is lower than that of the own cipher type of AES128 from the valid cipher types of the disabling control information 284. Accordingly, the third encryption algorithm unit 220C which supports the DES method becomes incapable of performing mutual authentication with an external device, so that the third encryption algorithm unit 220C is disabled. Further, when the mutual authentication unit 240A of the first encryption algorithm unit 220A succeeds in mutual authentication with an external device, for example, the mutual authentication unit 240A deletes AES128 and DES of which priority orders are lower than that of the own cipher type of AES256 from the valid cipher types. Accordingly, the second encryption algorithm unit 220B and the third encryption algorithm unit 220C become incapable of performing mutual authentication with an external device, so that the two encryption algorithm units 220 are disabled.

4-3. Process Flow

The process of the information processing apparatus 20 according to the present embodiment when receiving access from an external device is similar to that of the first information processing apparatus 10 which has been described with reference to FIGS. 8 to 11 except the disabling process by the mutual authentication unit 240.

Figure 23:
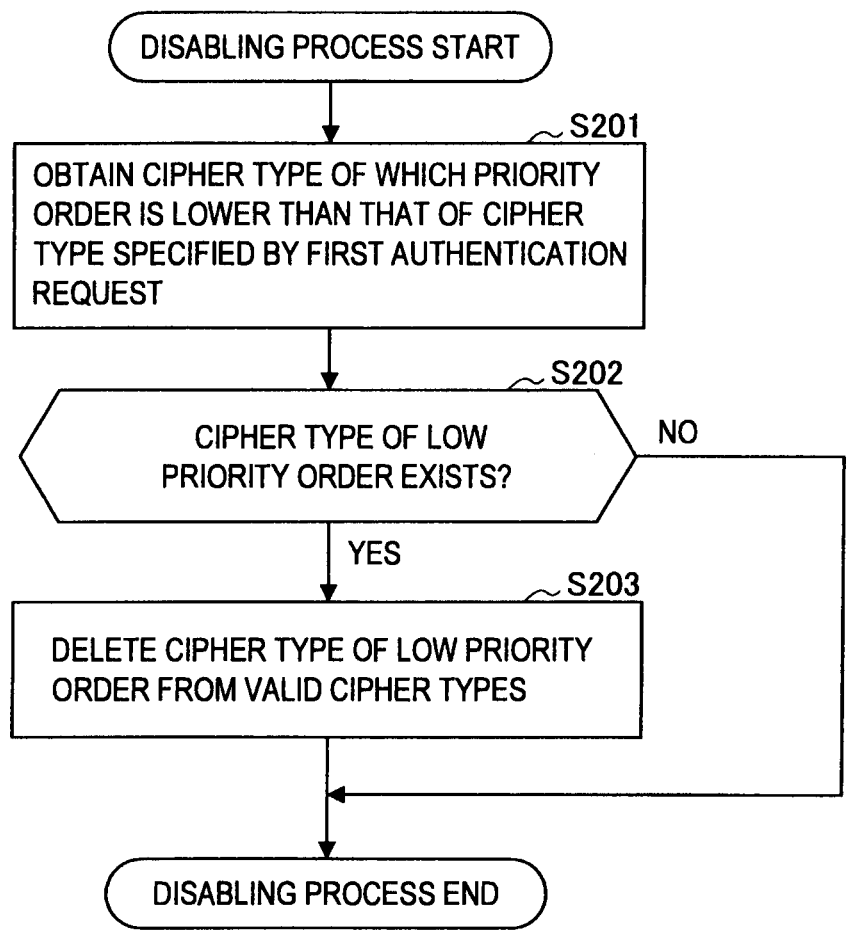
FIG. 23 is a flowchart which describes an example of detailed flow of the disabling process according to the second embodiment.

FIG. 23 is a flowchart which describes an example of detailed flow of the disabling process by the mutual authentication unit 240 of the encryption algorithm unit 220 according to the present embodiment.

As described in FIG. 23, first, the priority order stored at the data memory unit 180 is referenced and the cipher type of which priority order is lower than that of the cipher type specified by the first authentication request is obtained in step S201.

Next, in step S202, it is determined whether or not the cipher type obtained in step S201 exists as one or more. Herein, in the case that the obtained cipher type does not exist, the following disabling process is skipped. On the other hand, in the case that the obtained cipher type exists as one or more, the process proceeds to step S203.

Next, in step S203, the cipher type obtained in step S201 of which priority order is low is deleted from the valid cipher types stored at the data memory unit 180. With the data example of FIG. 22, in the case that the cipher type of AES128 is specified and mutual authentication is successfully performed, for example, DES is deleted from the valid cipher types. Accordingly, the third encryption algorithm unit 220C which uses the DES method becomes incapable of performing mutual authentication with an external device thereafter. Then, the disabling process according to the present embodiment ends.

Herein, it is also possible to define the priority order included in the disabling control information 284 by utilizing an equal sign (=) in part, for example, so that some cipher types are equal in the priority order. For example, it is assumed that the priority order is defined as an expression of AES256>AES128=CLEFIA 128>DES. Accordingly, CLEFIA128 is not to be disabled in the case that mutual authentication succeeds with AES128, and then, AES128 is not disabled in the case that mutual authentication succeeds with CLEFIA128.

Up to here, the information processing apparatus 20 according to the second embodiment of the present invention has been described with reference to FIGS. 20 to 23. In the present embodiment, the information processing apparatus 20 is provided with three encryption algorithm units 220 which respectively support three types of the encryption methods, for example. Further, the priority order which is predefined in accordance with the security strength of each of the encryption algorithm units 220 is stored at the data memory unit 180 of the information processing apparatus 20. Then, for example, when mutual authentication with an external device firstly succeeds by utilizing the encryption algorithm of which security strength is high, another encryption algorithm unit 220 of which security strength is low can be automatically deleted in accordance with the priority order.

Herein, the first to third modified examples which are described relating to the first embodiment can be combined with the second embodiment. Further, in the present embodiment, the example in which the data indicating the priority order is maintained in the disabling control information 284 is described. However, it is also possible that priority degree is numerically defined for each of the encryption algorithm units 220 based on the security strength and actualize the priority order corresponding to the magnitude of the priority degree by maintaining the priority degree in the cipher-specific information 286.

It should be understood by those skilled in the art that various modifications, combinations, sub-combinations and alterations may occur depending on design requirements and other factors insofar as they are within the scope of the appended claims or the equivalents thereof.

For example, each of the processes according to the first and second embodiments which are described with reference to the flowcharts is not necessarily performed in the order described in the flowcharts. It is also possible that each process step includes a process which is executed simultaneously or independently.

The present application contains subject matter related to that disclosed in Japanese Priority Patent Application JP 2008-265322 filed in the Japan Patent Office on 2008 Oct. 14, the entire content of which is hereby incorporated by reference.

What is claimed is:

1. An information processing apparatus comprising:
a plurality of encryption algorithm units which are respectively configured to perform mutual authentication with an external device by respectively using an encryption method or a cipher key being different from one another; and a data memory unit which stores a plurality of cipher-specific information being provided to each of the encryption algorithm units and including a cipher type which specifies an encryption method used by each of the encryption algorithm units and disabling control information for disabling at least one encryption algorithm unit among the plurality of encryption algorithm units; wherein at least a first encryption algorithm unit among the plurality of encryption algorithm units disables another encryption algorithm unit in accordance with the disabling control information which is stored at the data memory unit when a mutual authentication with an external device succeeds.

2. The information processing apparatus according to claim 1,
wherein the disabling control information includes a valid cipher type for distinguishing a valid encryption method among encryption methods used by the plurality of encryption algorithm units; and
each of the encryption algorithm units performs mutual authentication with an external device only in a case that a cipher type which is specified by an authentication request received from the external device is included in the valid cipher type which is stored at the data memory unit.

3. The information processing apparatus according to claim 2,
wherein the disabling control information further includes a disabling cipher type for distinguishing an encryption method to be automatically disabled; and
the first encryption algorithm unit deletes a cipher type which matches with the disabling cipher type from the valid cipher types stored at the data memory unit when the mutual authentication with the external device succeeds.

4. The information processing apparatus according to claim 1,
wherein the cipher-specific information further includes a generation number which specifies a generation of a cipher key used by each of the encryption algorithm units; and
the first encryption algorithm unit disables another encryption algorithm unit corresponding to a generation number which is older than a generation number which is specified by an authentication request received from the external device when the mutual authentication with the external device succeeds.

5. The information processing apparatus according to claim 4,
wherein the disabling control information includes a valid generation number for distinguishing a valid encryption algorithm unit among the plurality of encryption algorithm units; and
the first encryption algorithm unit disables the other encryption algorithm unit by updating the valid generation number.

6. The information processing apparatus according to claim 1,
wherein the first encryption algorithm unit disables another encryption algorithm unit in accordance with the disabling control information which is stored at the data memory unit only in a case that a special authentication request which instructs execution of disabling is received from the external device.

7. The information processing apparatus according to claim 1,
wherein the data memory unit stores a priority order which is predefined in accordance with security strength of each of the encryption algorithm units; and
the first encryption algorithm unit disables another encryption algorithm unit of which priority order is lower than that of the first encryption algorithm unit when the mutual authentication with an external device succeeds.

8. A method for switching cipher comprising the steps of:
storing a plurality of cipher-specific information being provided to each of a plurality of encryption algorithm units and including a cipher type which specifies an encryption method used by each of the encryption algorithm units and disabling control information for disabling at least one encryption algorithm unit among the plurality of encryption algorithm units at a memory area of an information processing apparatus which comprises the plurality of encryption algorithm units configured to respectively perform mutual authentication with an external device by respectively using an encryption method or a cipher key being different from one another; performing a mutual authentication with an external device by a first encryption algorithm unit among the plurality of encryption algorithm units; and disabling another encryption algorithm unit in accordance with the disabling control information which is stored at the memory area by the first encryption algorithm unit when a mutual authentication by the first encryption algorithm unit succeeds.

9. A non-transitory computer readable medium having stored thereon a computer program product that causes a computer which controls an information processing apparatus to: operate as a plurality of encryption algorithm units which are respectively configured to perform mutual authentication with an external device by respectively using an encryption method or a cipher key being different from one another; and disable another encryption algorithm unit by a first encryption algorithm unit in accordance with disabling control information stored at a data memory unit of the own apparatus for disabling at least one encryption algorithm unit among the plurality of encryption algorithm units when at least the first encryption algorithm unit among the plurality of encryption algorithm units succeeds in mutual authentication with an external device.

10. The information processing apparatus of claim 1, wherein the another encryption algorithm unit becomes incapable of performing mutual authentication with an external device after being disabled.

11. The information processing apparatus of claim 1, wherein the disabling control information includes at least one disabling cipher type.

12. The information processing apparatus of claim 11, wherein the at least one disabling cipher type is data for distinguishing an encryption method to be automatically disabled.

13. The method of claim 8, wherein the another encryption algorithm unit becomes incapable of performing mutual authentication with an external device after being disabled.

14. The non-transitory computer readable medium of claim 9, wherein the another encryption algorithm unit becomes incapable of performing mutual authentication with an external device after being disabled.

* * * * *